(12) United States Patent
Kaku

(10) Patent No.: US 7,035,440 B2
(45) Date of Patent: Apr. 25, 2006

(54) IMAGE COLLECTING SYSTEM AND METHOD THEREOF

(75) Inventor: Toshihiko Kaku, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 731 days.

(21) Appl. No.: 09/897,603

(22) Filed: Jul. 3, 2001

(65) Prior Publication Data

US 2002/0001468 A1 Jan. 3, 2002

(30) Foreign Application Priority Data

Jul. 3, 2000 (JP) .............................. 2000-201553

(51) Int. Cl.
*G06K 9/00* (2006.01)

(52) U.S. Cl. ...................... 382/115; 382/103; 382/305; 707/104.1; 348/169

(58) Field of Classification Search ........ 382/115–127, 382/103, 305; 707/104.1; 348/169
See application file for complete search history.

(56) References Cited

U.S. PATENT DOCUMENTS

| | | | | |
|---|---|---|---|---|
| 5,381,155 A | * | 1/1995 | Gerber | 342/104 |
| 5,508,737 A | * | 4/1996 | Lang | 348/159 |
| 5,554,984 A | * | 9/1996 | Shigenaga et al. | 340/937 |
| 5,577,179 A | * | 11/1996 | Blank | 345/639 |
| 5,602,375 A | * | 2/1997 | Sunahara et al. | 235/384 |
| 5,655,053 A | * | 8/1997 | Renie | 386/117 |
| 5,694,514 A | * | 12/1997 | Evans et al. | 386/46 |
| 5,872,887 A | * | 2/1999 | Walker | 386/117 |
| 6,396,537 B1 | * | 5/2002 | Squilla et al. | 348/239 |
| 6,490,409 B1 | * | 12/2002 | Walker | 386/117 |
| 6,513,015 B1 | * | 1/2003 | Ogasawara | 705/26 |
| 6,526,158 B1 | * | 2/2003 | Goldberg | 382/115 |
| 6,567,121 B1 | * | 5/2003 | Kuno | 348/211.3 |
| 6,591,068 B1 | * | 7/2003 | Dietz | 396/429 |
| 6,698,943 B1 | * | 3/2004 | Gluck | 396/427 |

* cited by examiner

Primary Examiner—Bhavesh M. Mehta
Assistant Examiner—Aaron Carter
(74) Attorney, Agent, or Firm—Sughrue Mion, PLLC

(57) ABSTRACT

An image collecting system for collecting an image having a target character therein comprising a camera system that captures an image in which the target character is caught in a predetermined area; an image database that stores images captured by the camera system; a character information database that stores character information for identifying a person caught in an image as the target character; a character positioning unit for obtaining position information of the target character at a certain time; and an image collecting unit that connects to the image database and the character information database to identify images stored in the image database with the target character therein based on the character information stored in the character information database and the position information of the target character obtained by the character positioning unit, and collect images in which the target character is caught from the images stored in the image database.

56 Claims, 26 Drawing Sheets

CHARACTER DB

| CHARACTER ID | FRIEND ID | CHARACTER INFORMATION | | ENTRY TIME | POSITION INFORMATION | RESTRICTION FOR OTHERS NOT TO OBTAIN ONE'S IMAGE |
|---|---|---|---|---|---|---|
| | | DATA AT ENTRY | UPDATE DATA | | | |
| 1 | 4, 5 | FACE PARAMETER (1) | NO | 9:00 | 9:10=POINT A | YES |
| 2 | 3 | FACE PARAMETER (2) | UPDATED FACE PARAMETER (2) | 9:15 | 9:30=POINT B, 10:00=POINT C, ... | NO |
| 3 | 2 | FACE PARAMETER (3) | NO | 9:20 | 9:30=POINT B, 10:00=POINT C, ... | NO |
| | | | | | | |
| | | | | | | |
| | | | | | | |

IMAGE DB        120

| IMAGE ID | IMAGE CAPTURING PROPERTY | | | IDENTIFIED CHARACTER ID | | | | |
|---|---|---|---|---|---|---|---|---|
| | CAMERA ID | POSITION INFORMATION | | | | | | |
| | | PLACE | TIME | | | | | |
| 1 | 5 | POINT A | 10:00 | 1 | | | | |
| 2 | 6 | POINT A | 10:01 | 2 | 3 | | | |
| 3 | 1 | POINT B | 10:03 | 8 | 13 | | | |
| | | | | | | | | |
| | | | | | | | | |

FIG. 4

IMAGE SET DB        130

| SET IMAGE ID | | IMAGE ID | | | | | |
|---|---|---|---|---|---|---|---|
| ANGLE SET | CHRONOLOGICAL SET | | | | | | |
| A1 | | 11 | 12 | 13 | 14 | 15 | |
| A2 | | 6 | 7 | 8 | | | |
| | T1 | 15 | 17 | 20 | 24 | | |
| | | | | | | | |
| | | | | | | | |

FIG. 5

95: CHARACTER IDENTIFYING UNIT

| SET IMAGE ID | IMAGE ID |
|---|---|
| A1 (ANGLE SET) | 11  12  13  14  15 |

INCLUDES CHARACTER X IN COMMON

THE CHARACTER X IN IMAGE ID 11 IS IDENTIFIED AS CHARACTER ID 19

THE CHARACTER X IN IMAGES ID 12 THROUGH 15 IS ALSO IDENTIFIED AS CHARACTER ID 19

95: CHARACTER IDENTIFYING UNIT

| SET IMAGE ID | IMAGE ID |
|---|---|
| A2 (ANGLE SET) | 51  52 |

INCLUDE CHARACTER
X51, X52, X53, AND X54
IN COMMON

EACH OF THE PERSONS IN IMAGE ID 51
IS IDENTIFIED

EACH OF THE PERSONS ARE VERIFIED
(FIG. 7B)

IDENTIFY EACH PERSON

95:CHARACTER IDENTIFYING UNIT

| SET IMAGE ID | IMAGE ID |
|---|---|
| T1 (CHRONOLOGICAL SET) | 21  22  23  24  25 |

INCLUDES CHARACTER Y IN COMMON

THE CHARACTER Y IN IMAGE ID 21 IS IDENTIFIED AS CHARACTER ID 29

THE CHARACTER Y IN IMAGES ID 22 THROUGH 25 IS ALSO IDENTIFIED AS CHARACTER ID 29

DETECT POSITION OF A CHARACTER

↓

THE CHARACTER COMES TO A PREDETERMINED POSITION

↓

CAPTURE IMAGE

INFORMATION FOR BROWSING COLLECTED IMAGES AND SELECTING OUTPUT SETTING

THERE ARE ○○ IMAGES MATCHING TO YOUR CONDITION
PLEASE SELECT PURCHASING IMAGES

WHICH MEDIUM DO YOU OUTPUT ON?

☐ PAPER ☐ MD
☑ CD-R ☐ ON THE WEB ☐ ATTACHED TO E-MAIL

☑ 5 IMAGES ARE PURCHASED FOR 50 YEN.

PURCHASE

FIG. 15

POSITION INFORMATION DB

| CHARACTER ID | 1 |
|---|---|

| TIME | PLACE |
|---|---|
| 13:00 | POINT A |
| 13:10 | POINT A |
| 13:20 | POINT B |
| 13:30 | POINT B |
| ⋮ | |

230

320:CHARACTER IMAGE RECOGNIZING UNIT

IMAGE DETECTING CONDITION
· CONDITION FOR DELETING IMAGE
· EYES ARE CLOSED
· FACIAL EXPRESSION IS ANGRY

| ○ DETECT ✕ DELETE | ○ | ✕ | ○ | ✕ |
|---|---|---|---|---|
|  |  |  |  |  |
|  | IMAGE1 | IMAGE2 | IMAGE3 | IMAGE4 |

IMAGE COLLECTING SYSTEM AND METHOD THEREOF

This patent application claims priority from a Japanese patent application No. 2000-201553, filed on Jul. 3, 2000, the contents of which are incorporated herein by reference.

BACKGROUND OF THE INVENTION

1. Field of the Invention

The present invention relates to an image collecting system and method thereof. More particularly, the present invention relates to system and method for collecting images in which a certain individual or target character is present.

2. Description of the Related Art

People visiting an amusement park or the like take pictures at various places and times in the amusement park for souvenirs. The pictures are usually taken with a camera which is owned by a person visiting the amusement park. The person who wants to be pictured stops, poses, and asks someone else to take a picture. When a group of people go to an amusement facility, people in the group take pictures of one another.

Pictures are preferably taken at a place that has appealing characteristics such as an object in a facility which catches the eye. When people move along a route in a certain facility of the amusement park, pictures are taken along the route.

Conventionally, if a person wants to take pictures, the person needs to bring their own camera. The camera often is a burden to carry around while people enjoy themselves, although if no one in a group has a camera, they cannot take photographs. When a person plays in the amusement park, it is not easy for the person to take their own photographs. People stop, prepare and take pictures. For taking pictures, people need to interrupt their activities in the facility. Further, the target character typically poses to be photographed so that natural facial expression and behavior is not caught in the picture. Furthermore, typically the person who has the camera takes the pictures so that he or she has fewer pictures of themselves with the rest of the group. Because the person who takes the pictures has to think about timing the photographs, he or she cannot fully enjoy the activities in the amusement facility.

SUMMARY OF THE INVENTION

Therefore, it is an object of the present invention to provide an image collecting system, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an image collecting system for collecting an image having a target character therein comprises a camera system that captures an image in which the target character is caught in a predetermined area; an image database that stores images captured by the camera system; a character information database that stores character information for identifying a person caught in an image as the target character; a character positioning unit for obtaining position information of the target character at a certain time; and an image collecting unit that connects to the image database and the character information database to identify images stored in the image database with the target character therein based on the character information stored in the character information database and the position information of the target character obtained by the character positioning unit, and collect images in which the target character is caught from the images stored in the image database.

The image collecting system may further comprise an image transmitter that connects to the camera system, the image database storing the images transmitted by the image transmitter; a position transmitter that transmits signals having the position information of the target character; and a receiver, located remote from the position transmitter, that receives the signals from the position transmitter, the receiver being operably connected to the character positioning unit.

The image collecting system may further comprise an ID information holder to be carried by the target character, the ID information holder having ID information that uniquely identifies the target character; and an ID information reader for reading the ID information from the ID information holder, wherein the character positioning unit obtains the position information of the target character based on the ID information read by the ID information reader.

When the target character is among a plurality of persons that are caught in a plurality of images, the position information of each person of the plurality of persons may include relative position information of the each person with respect to the plurality of persons, and each person of the plurality of persons may be identified in one of the plurality of images and the target character from the plurality of persons is identified in all of the plurality of images, the image collecting unit may identify the rest of the plurality of persons in the rest of the plurality of images based on the relative position information of the each person.

The camera system may include a camera group having a plurality of cameras which capture a plurality of images in which a same person is caught from a plurality of different angles, and when a person in one of the plurality of images, which is caught by a camera included in the camera group, is identified as the target character, the image collecting unit may identify the same person in the rest of the plurality of images captured by the rest of the cameras included in the camera group as the target character, without accessing the character information database repeatedly.

The camera system may include a camera group having at least one camera which captures a plurality of images in which a same person is caught at sequentially different moments, when the same person is identified as the target character in one of the plurality of images caught by the at least one camera in the camera group, the image collecting unit may identify the same person in the rest of the plurality of images as the target character, without accessing the character information database repeatedly.

The character positioning unit may obtain the position information of the target character which includes information that the target character passes a first predetermined point at a certain first time, and the image collecting unit may limit images to identify the target character to images that are captured in a moving range of the target character for a period of time based on the first time the target character passes the first predetermined point.

The character positioning unit may obtain further position information of the target character which includes information that the target character passes a second predetermined point at a second time different from the first time, and the image collecting unit may limit the images to identify the target character to images that are captured in the moving range for the period based on the first time and the second time that the target character passes the first and second predetermined points, respectively.

The camera system may include a plurality of cameras operable to capture images in a predetermined route, the character positioning unit may obtain the position information including information that the target character passes the first predetermined point on the predetermined route at the first time, and the image collecting unit may limit the images to identify the target character to images that are captured in the moving range based on the time the target character passes the first predetermined point on the predetermined route.

The character positioning unit may obtain further position information of the target character which includes information that the target character passes a second predetermined point in the predetermined route at a second time different from the first time, and the image collecting unit may limit the images to identify the target character to images that are captured in the moving range based on the first time and the second time the target character passes the first and second predetermined points, respectively, in the predetermined route.

The image collecting system may further comprise a character speed obtaining unit that detects a speed of the target character, while moving through a predetermined route, at a certain moment at a predetermined point in the predetermined route; and a character position forecasting unit that forecasts a position of the target character after a predetermined time from the certain moment based on the speed of the target character going through the predetermined route and the position information of the target character at the moment the target character passes the predetermined point, wherein the camera system includes a plurality of cameras which capture images in the predetermined route, and the image collecting unit limits images to identify the target character to images that are captured by a camera included in the plurality of cameras and provided at the position forecast by the character position forecasting unit.

According to the second embodiment of the present invention, an image screening system that effectively accumulates data of images in which a certain target character is caught into an image database may comprise: a camera system that captures an image having the target character therein in a predetermined area, and that records a time and place the image is captured; an image transmitter that operably connects to the camera system; a character information database that stores character information for identifying a person caught in an image as the target character; a character positioning unit for obtaining position information of the target character at a certain time; an image screening unit for identifying a person caught in the image as the target character based on the time and place the image is captured, the character information stored in the character information database, and position information of the target character obtained by the character positioning unit, and for selecting the image having the target character therein from images captured by the camera system and transmitted by the image transmitter; and an image database that connects to the image screening unit and stores data of the selected image having the target character therein.

The image screening system may further comprise: a position transmitter for being carried by the target character; and a receiver that is located remote from the position transmitter to receive signals from the position transmitter, the receiver being operably connected to the character positioning unit.

The image screening system may further comprise an ID information holder to be carried by the target character, the ID information holder having ID information that uniquely identifies the target character; and an ID information reader for reading the ID information from the ID information holder, wherein the character positioning unit obtains the position information of the target character based on the ID information read by the ID information reader.

When the target character is among a plurality of persons that are caught in a plurality of images, the position information of each person of the plurality of persons may include relative position information of the each person with respect to the plurality of persons, and each person of the plurality of persons may be identified in one of the plurality of images and the target character from the plurality of persons is identified in all of the plurality of images, the image collecting unit may identify the rest of the plurality of persons in the rest of the plurality of images based on the relative position information of the each person.

The camera system may include a camera group having a plurality of cameras which capture a plurality of images in which a same person is caught from a plurality of different angles, and when a person in one of the plurality of images, which is caught by a camera included in the camera group, is identified as the target character, the image screening unit may identify the same person in the rest of the plurality of images captured by the rest of the cameras included in the camera group as the target character, without accessing the character information database repeatedly.

The camera system may include a camera group having at least one camera which captures a plurality of images in which a same person is caught at sequentially different moments, when the same person is identified as the target character in one of the plurality of images caught by the at least one camera in the camera group, the image screening unit may identify the same person in the rest of the plurality of images as the target character, without accessing the character information database repeatedly.

The character positioning unit may obtain the position information of the target character which includes information that the target character passes a first predetermined point at a certain first time, and the image screening unit may limit images to identify the target character to images that are captured in a moving range of the target character for a period of time based on the first time the target character passes the first predetermined point.

The character positioning unit may obtain further position information of the target character which includes information that the target character passes a second predetermined point at a second time different from the first time, and the image screening unit limits the images to identify the target character to images that are captured in the moving range for the period based on the first time and the second time that the target character passes the first and second predetermined points, respectively.

The camera system may include a plurality of cameras operable to capture images in a predetermined route, the character positioning unit may obtain the position information including information that the target character passes the first predetermined point on the predetermined route at the first time, and the image screening unit may limit the images to identify the target character to images that are captured in the moving range based on the time the target character passes the first predetermined point on the predetermined route.

The character positioning unit may obtain further position information of the target character which includes information that the target character passes a second predetermined point in the predetermined route at a second time different from the first time, and the image screening unit may limit the images to identify the target character to images that are captured in the moving range based on the first time and the second time the target character passes the first and second predetermined points, respectively, in the predetermined route.

The image screening system may further comprise: a character speed obtaining unit that detects a speed of the target character, while moving through a predetermined route, at a certain moment at a predetermined point in the predetermined route; and a character position forecasting unit that forecasts a position of the target character after a predetermined time from the certain moment based on the speed of the target character going through the predetermined route and the position information of the target character at the moment the target character passes the predetermined point, wherein the camera system includes a plurality of cameras which capture images in the predetermined route, and the image screening unit may limit images to identify the target character to images that are captured by a camera included in the plurality of cameras and provided at the position forecast by the character position forecasting unit.

According to the third embodiment of the present invention, a method for collecting an image having a target character therein in a predetermined area, comprises: registering character information of the target character; capturing images in which the target character is caught and recording a time and place each image is captured; storing image data of the captured images; obtaining position information of the target character; identifying a person in each of the images thus stored as the target character based on at least one of the character information thus registered, the time and place that the each image is captured, and the position information of the target character when the each image is captured obtained by the obtaining of position information; and collecting images in which the target character is identified.

The method for collecting an image may further comprise: transmitting position signals for the target character in the predetermined area from a transmitter carried by the target character, and receiving position signals of the target character that are transmitted by the transmitting of position signals, wherein the position information of the target character is obtained based on the received position signals of the target character.

The method for collecting an image may further comprise: allocating character ID to substantially every person in the predetermined area, wherein the character ID may include at least one of the character information and the position signals corresponding to the every person.

When the target character is among a plurality of persons that are caught in a plurality of images, the obtaining of position information obtains relative position information of each person with respect to the plurality of persons, and the identifying of a person includes: identifying each person of the plurality of persons in one of the plurality of images, identifying the target character in all of the plurality of images, and identifying the rest of the plurality of persons in the rest of the plurality of images based on the relative position information of the each person.

The capturing images may include capturing a plurality of images in series in which a same person is caught, and the identifying a person may include: identifying a person in one of the plurality of images as the target character, and identifying the same person in the rest of the plurality of images as the target character, without using the character information repeatedly.

The capturing of a series of images includes capturing the plurality of images in series from a plurality of different angles. The capturing of a series of images includes capturing the plurality of images in series at sequentially different moments.

The obtaining of position information may include detecting a first time that the target character passes a first predetermined point, and the identifying a person may include limiting images to identify the target character to images that are captured in a moving range of the target character for a period of time based on the first time the target character passes the first predetermined point.

The obtaining of position information may include detecting a second time, different from the first time, that the target character passes a second predetermined point, and the identifying a person may include limiting the images to identify the target character to images that are captured in the moving range for the period based on the first time and the second time that the target character passes the first and second predetermined points, respectively.

Capturing images may include capturing a plurality of images in a predetermined route, the obtaining of position information may include detecting that the target character passes the first predetermined point on the predetermined route at the first time, and the identifying a person may include limiting the images to identify the target character to images that are captured in the moving range based on the time the target character passes the first predetermined point on the predetermined route.

The obtaining of position information may include detecting a second time, different from the first time, that the target character passes a second predetermined point in the predetermined route, and the identifying a person may include limiting the images to identify the target character to images that are captured in the moving range based on the first time and the second time the target character passes the first and second predetermined points, respectively, in the predetermined route.

The method for collecting an image may further comprise: detecting a speed of the target character, while moving through a predetermined route, at a certain moment at a predetermined point in the predetermined route; and forecasting a position of the target character after a predetermined time from the certain moment based on the detected speed of the target character going through the predetermined route and obtained position information of the target character at the moment the target character passes the predetermined point, wherein the capturing images includes capturing a plurality of images in the predetermined route, and the identifying a person includes limiting images to identify the target character to images that are captured at the position in forecasting of a position.

According to the fourth embodiment of the present invention, a method for screening an image captured in a predetermined area, in order to store image data having a target character therein, the method may comprise: registering character information of the target character; capturing images including at least one image with the target character therein, and recording a time and place each image is captured; obtaining position information of the target character; screening images thus captured for the at least one image with the target character, based on registered character information, recorded time and place the each image is captured, and position information of the target character when the at least one image with the target character is captured; and storing image data of the screened at least one image with the target character is caught.

The method for screening an image may further comprise: transmitting position signals of the target character in the predetermined area from a transmitter with the target character, and receiving position signals of the target character that are transmitted by the transmitting of position signals, for obtaining position information of the target character therefrom.

The method for screening an image may further comprise: allocating character ID to at least the target character in the predetermined area, wherein the character ID includes at least one of the character information and the position signals of the target character.

When the target character is among a plurality of persons that are caught in a plurality of images, the obtaining of position information may obtain relative position information of each person with respect to the plurality of persons, and the screening of images may include: identifying each person of the plurality of persons in one of the plurality of images, identifying the target character in all of the plurality of images, and identifying the rest of the plurality of persons in the rest of the plurality of images based on the relative position information of the each person.

The capturing images may include capturing a plurality of images in series in which a same person is caught, and the screening of images may include: identifying a person in one of the plurality of images as the target character, and identifying the same person in the rest of the plurality of images as the target character, without using the registered character information repeatedly.

The capturing of a series of images may include capturing the plurality of images in series from a plurality of different angles. The capturing of a series of images may include capturing the plurality of images in series at sequentially different moments.

The obtaining of position information may include detecting a first time that the target character passes a first predetermined point, and the screening of images may include limiting images to identify the target character to images that are captured in a moving range of the target character for a period of time based on the first time the target character passes the first predetermined point.

The obtaining of position information may include detecting a second time, different from the first time, that the target character passes a second predetermined point, and the screening of images includes limiting the images to identify the target character to images that are captured in the moving range for the period based on the first time and the second time that the target character passes the first and second predetermined points, respectively.

Capturing images may include capturing a plurality of images in a predetermined route, the obtaining of position information may include detecting that the target character passes the first predetermined point on the predetermined route at the first time, and the screening of images may include limiting the images to identify the target character to images that are captured in the moving range based on the first time the target character passes the first predetermined point on the predetermined route.

The obtaining of position information may include detecting a second time, different from the first time, that the target character passes a second predetermined point in the predetermined route, and the screening of images may include limiting the images to identify the target character to images that are captured in the moving range based on the first time and the second time the target character passes the first and second predetermined points, respectively, in the predetermined route.

The method for screening an image may further comprise: detecting a speed of the target character, while moving through a predetermined route, at a certain moment at a predetermined point in the predetermined route; and forecasting a position of the target character after a predetermined time from the certain moment based on the detected speed of the target character going through the predetermined route and obtained position information of the target character at the moment the target character passes the predetermined point, wherein the capturing images may include capturing a plurality of images in the predetermined route, and the screening of images may include limiting images to identify the target character to images that are captured at the position in forecasting of a position.

According to the fifth embodiment of the present invention, an image identifying system for identifying a plurality of persons caught in a plurality of images, captured in a predetermined area, with at least one target character therein, the image identifying system may comprise: an image set database that stores a plurality of images; each image of the plurality of images having the plurality of persons therein with at least one target character comprises an image set in the image set database; a character information database that stores character information for identifying a person in an image as the target character; a character positioning unit for obtaining position information of the at least one target character and relative position information of each person with respect to the plurality of persons in the image set; and an image identifying unit for identifying the plurality of persons in the image set, wherein when the image identifying unit identifies substantially all of the plurality of persons in one image included in the image set, based on the character information of the at least one target character in the one image and the relative position information of each person in the plurality of persons, the plurality of persons in the rest of the images in the image set is identified.

The image set may comprise a plurality of images captured from a plurality of angles at substantially the same time. The image set may comprise a plurality of images captured at sequentially different moments in a period of time while the relative position information of each person in the plurality of persons substantially does not change.

According to the sixth embodiment of the present invention, a method for identifying a plurality of a same set of persons having at least one target character, caught in a plurality of images which are captured in a predetermined area, the method may comprise: registering character information of each target character; capturing the plurality of images with the same set of persons having at least one target character therein; obtaining position information of each target character and relative position information of each person with respect to the same set of persons; and identifying the plurality of the same set of persons in the plurality of images based on registered character information, captured images, and obtained position information, wherein when the each person of the same set of persons is identified in one of the plurality of images and one person of the same set of persons is identified in the rest of the plurality of images, the rest of the same set of persons in the rest of the plurality of the images are identified based on the relative position information of the each person in the same set of persons.

The capturing of the plurality of images may include capturing images, with the same set of persons having at least one target character, at substantially the same time from a plurality of angles.

The relative position information of the each person in the same set of the persons substantially does not change, and the capturing of the plurality of images includes capturing images, with the same set of persons having at least one target character, at sequentially different moments of time.

According to the seventh embodiment of the present invention, a server for collecting an image in which a certain target character is caught, may comprise: an image database storing image data, the image data including data of the image in which the target character is caught and data about when and where the image is captured; a character information database storing character information of the target character for identifying a person caught in the image with the target character; a character positioning unit obtaining position information of the target character; and an image collecting unit, connecting to the image database, the character information database, and the character positioning unit, for identifying the person caught in the image with the target character, and collecting the image in which the target character is caught from the image data stored in the image database, wherein the image collecting unit identifies the person caught in the image stored in the image database with the target character based on the data about when and where the image is captured, the character information stored in the character information database, and position information of the target character when the image is captured obtained by the character positioning unit.

According to the eighth embodiment of the present invention, an image screening server for accumulating images, in which a person as a target character is caught, into an image database for effectively offering an image in which the target character is caught, may comprise: a character information database storing character information for identifying the person caught in the image with the target character; a character positioning unit obtaining position information of the target character; an image screening unit connecting to the character information database and the character positioning unit, and screening the images, when the images in which the target character is caught are sent with data about when and where the image is captured, the image screening unit screening the images based on a time and place each of the images is captured, the position information of the target character when the each image is captured obtained by the character positioning unit, and the character information stored in the character information database; and an image database storing screened images in which the target character is caught.

According to the ninth embodiment of the present invention, a recording medium which stores a program for a computer for collecting an image in which a target character is caught in a predetermined area, the program may comprise: a first communicating module, which operates the computer to communicate with an image database storing the image, when image data having a person as the target character therein is sent with data about when and where the image is captured; a second communicating module, which operates the computer to communicate with a character information database storing character information for identifying a person caught in the image with the target character; a third communicating module, which operates the computer to communicate with a character positioning device obtaining position information of the target character; and an image collecting module, which operates the computer to connect to the first communicating module, the second communicating module, and the third communicating module, the image collecting module identifying the person caught in the images sent from the first communicating module with the target character based on the data about when and where the image is captured sent from the first communicating module, the character information sent from the second communicating module, and the position information of the target character when the image is captured sent from the third communicating module, and collecting the image in which the target character is caught.

According to the tenth embodiment of the present invention, a recording medium which stores a program for a computer for storing images, in which a person as a target character is caught, to accumulate into an image database for effectively offering an image in which the target character is caught, the program may comprise: a first communicating module, which operates the computer to communicate with a character information database storing character information for identifying a person caught in an image as the target character; a second communicating module, which operates the computer to communicate with a character positioning device obtaining position information of the target character; an image screening module, which operates the computer to connect to the first communicating module and the second communicating module, to receive images in which the target character is caught sent with data of when and where the images are captured, and screen the images based on when and where each image is captured, the character information stored in the character information database sent by the first communicating module, and the position information of the target character at the time the each image is captured sent by the second communicating module, and a third communicating module, which operates the computer to communicate with an image database, to write the image in which the target character is caught, screened by the image screening module, to the image database.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 3 shows an example of the information stored in the character information database 110.

FIG. 4 is an explanatory diagram of the image database 120.

FIG. 5 is an explanatory diagram of the image set database 130.

FIG. 15 shows an example of a collected image list and output setting information indicated on the image selecting terminal 50.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
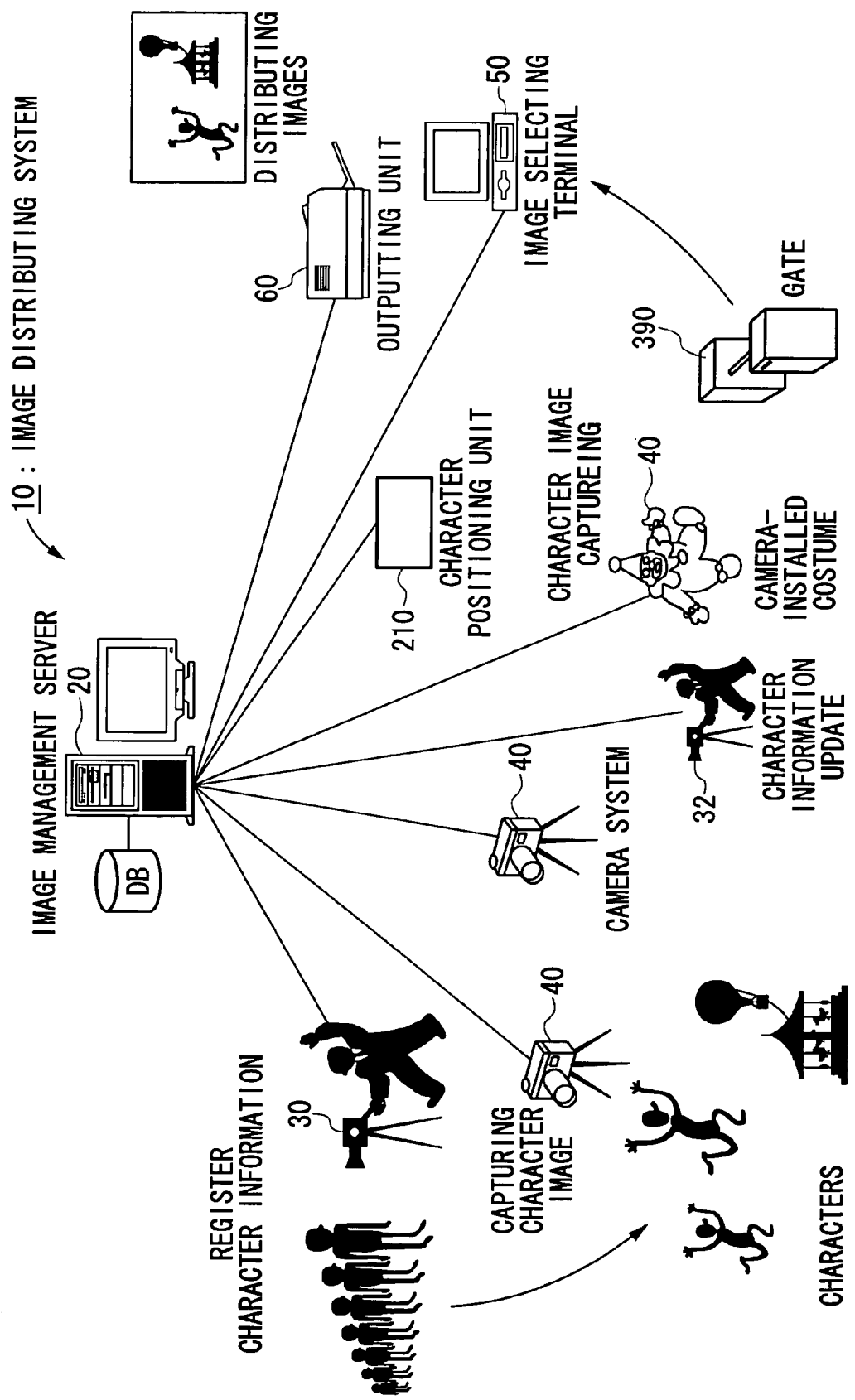
FIG. 1 shows an example of an image collecting system 10 according to an embodiment of the present invention which is applied to an amusement park.

FIG. 1 shows an example of the image distributing system 10 according to an embodiment of the present invention which is applied to an amusement park. In this embodiment, the image distributing system 10 targets a person, i.e., the target character, who is playing in an amusement park.

The image distributing system 10 has an image management server 20, a character information obtaining unit 30, a character information updating unit 32, a character positioning unit 210, a camera system 40, an image selecting terminal 50, and an outputting unit 60.

The character information obtaining unit 30 obtains character information of a characteristic such as face, body, and outfits of a character for whom images are outputted by the outputting unit 60 and distributed by the image distributing system 10. The character information obtaining unit 30 includes, for example, a plurality of cameras for capturing character information. The cameras for capturing character information capture images from various angles such as a head-on and a profile of the person. Another example of the character information obtaining unit 30 is a scanner for reading an image. In this case, the scanner reads a photograph, for example, printed on a driver s license. On the other hand, in a case where the character information is already recorded on an ID card, an ID card reader for reading information recorded on the ID card may be used as a character information obtaining unit 30. The ID card is issued when the character information is registered.

The character information obtaining unit 30 transmits the obtained character information, for example, via a LAN. The LAN may receive a wireless signal transmission. The character information obtained by the character information obtaining unit 30 is transmitted to a character information database 110, shown in FIG. 2 in the image management server 20, through the LAN. Other than a LAN, a portable wireless transmitter with a cellular phone may be employed. In still another example, a wireless transmitter may be installed in an ID card which is issued to the person who is the target character at the entrance of the amusement park as described later.

Some persons playing in the amusement park do not want other people to obtain their picture image. To satisfy such persons, character information of the person is registered, and an option is set such that only the person who is captured in the image is allowed to obtain the image. Entering the amusement park, every person is prompted to choose whether he or she wants a distribution of his or her images or refuses to have their images captured. When the person wants images in which he or she is caught, the person may set an optional restriction such that others can not obtain any image in which the registering person is caught. Using such optional settings, when another person collects images, an image having the specific person is omitted from the images collected for the other person. Such information about the restrictions on image collection is also included in the character information. The image collecting unit does not collect those images which have at least one person who refuses to have their image captured.

Figure 2:
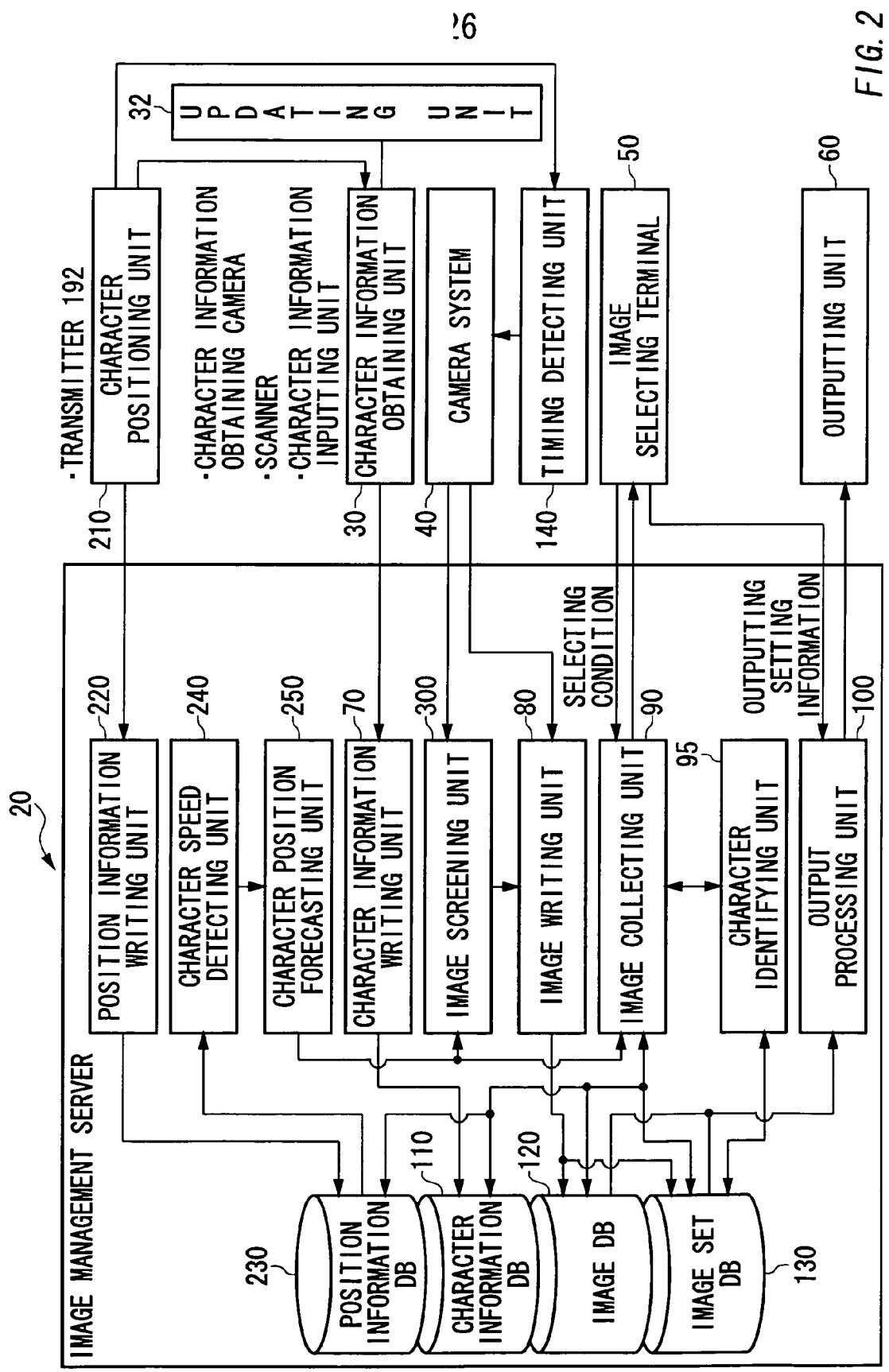
FIG. 2 is a block diagram of the image management server 20.

The character information updating unit 32 registers once again, i.e., updates, the character information about a target character whose character information is already registered. The character information updating unit 32 includes a camera system for re-registration of the character information, and for capturing the character information again by capturing an image of the character. The character information updating unit 32 operates mainly when a person changes his or her appearance while playing in the amusement park, for example, if a person purchases a hat or a T-shirt and puts on the hat or the shirt. In such case, the character information for the person registered previously can no longer be utilized for proper image collection. Thus, using the character information updating unit 32, the character information is updated. The character information obtained by the character information updating unit 32 is transmitted to the image management server 20, and the character information in the character information database 110 shown in FIG. 2 is updated.

The camera system 40 includes a plurality of cameras. The cameras are installed at particular places in an amusement facility. The installed cameras are preferably painted similar to the surrounding color and patterns, so that the target character can not easily recognize the existence of the cameras. Thus, the images of the person are obtained with ordinary behavior and natural facial expression without posturing or consciousness of the camera. The data of the image captured by the camera system 40 are transmitted to the image management server 20 and stored in an image database 120, described later, which is provided in the image management server 20.

The camera system 40 located in the amusement facility includes a camera installed in a costumed character, which is one of the attractions in the amusement park, walking around the amusement park greeting and shaking hands with people so that it attracts the attention of the people playing in the amusement park. The camera 40 is installed in the costumed character so that it is not easily apparent from the outside. The image around (especially in front of) the costumed character is captured, so that a natural facial expression of a person approaching the costumed character with interest in the costumed character is caught in the image. In this case, the camera system 40 transmits captured images to the image management server 20 using a wireless transmitter.

Furthermore, the camera system 40 includes a camera which follows a predetermined specific object, for example, the above described costumed character, and keeps capturing images. Using the associated camera, images of persons playing with the costumed character and the costumed character are captured. The camera 40 is set such that the camera 40 captures images including the person, the costumed character, and a landmark in the amusement park such as a water fountain, a merry-go-round, and a Ferris wheel.

Here, images captured by the camera system 40 may include a still picture and a moving image. Moving images record a series of actions of the person playing in the amusement facility, so that images that are more impressive and realistic than still images showing how the person played in the amusement park are distributed.

Further, the camera system 40 may include a camera for identifying the person who is the target character. The camera is only used for identifying each person playing in the amusement park. For example, a camera for obtaining character identification is provided at a gate 390 where an ID card for identifying the person is checked. The ID card may also work as a ticket for the amusement park and a pass for entering the facilities in the amusement park. When the person passes through the gate 390, which is set at an entrance to each of the facilities in the amusement park, with the ID card, the camera 40 for obtaining character identification captures an image of the person who passes through the gate 390. Thus, without being recognized by the person who is the target character, the character information updating unit 32 may update the character information of each person. The character positioning unit 210 obtains position information of each of the persons at the same time.

Determination of the region caught in a certain image will be described now. The region caught in the image captured by a camera is calculated by the direction and angle of the camera 40 when the camera 40 is fixed at a predetermined position. When the camera 40 is a portable camera or installed in the costumed character, the camera 40 may include a GPS device so that a position of the camera 40 is specified. In other case, the region where the image is captured is specified by applying image recognition on the image captured by the camera 40, both when the camera 40 is located in a predetermined position and when the camera 40 is movable.

The image management server 20 stores the character information transmitted from the character information obtaining unit 30. The image management server 20 also stores the image transmitted from the camera system 40. The image management server 20 stores not only the image but also information attached to the transmitted image, for example, the position information such as when and where the image is captured.

Figure 14:
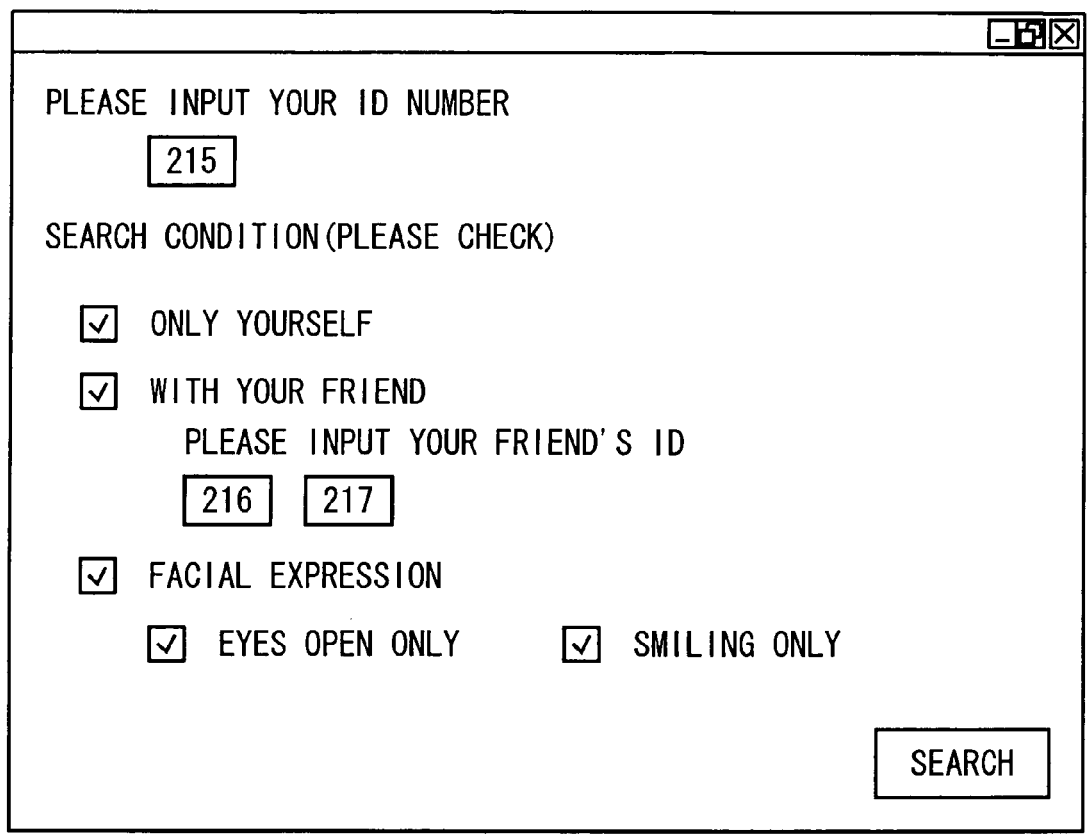
FIG. 14 shows an example of information indicated on the image selecting terminal 50 when the user inputs the selecting condition to the image distributing system.

The image selecting terminal 50 offers the user collected images in which the user is caught from the images stored in the image management server 20. The image selecting terminal 50 obtains conditions to collect selected images from the images stored in the image management server 20. The user appoints these conditions for collecting images as shown in FIG. 14 which is described in the following. The user selects images the user wants to purchase from the offered images. After the collecting is executed, the images to be outputted are selected from the collected images. The user appoints the outputting medium on which the images are outputted.

The outputting unit 60 outputs the images appointed by the image selecting terminal 50 to the appointed outputting medium.

Next, the image distributing system 10 will be described from a viewpoint of the user of the present system with reference to FIG. 1.

First, a person who wants to purchase their own images registers their character information at the character information obtaining unit 30. The registered character information is transmitted to the image management server 20. After the registration of the character information, the user plays in the amusement park without being aware of the camera system. While playing, images in which the user is present are captured by the camera system 40. The character information of the user is updated when the character information updating unit 32 captures new character information or when the user goes through the gate 390. The user goes to the image selecting terminal 50 whenever he or she wants, and selects images the user wants to purchase from the images already captured showing the user playing. The collection of the images is executed based on the registered character information. The user is prompted to select a medium on which the images are to be outputted. Thus, the user obtains images of themselves while playing in the amusement park without taking their own pictures.

The character information may be registered while playing in the amusement facility or after playing in the amusement facility. In the latter case, the character information is obtained by a camera installed in the image selecting terminal 50. The system collects the images in which the person who is the target character is caught from all the images captured by the camera 40 based on the character information. The person selects the images to be purchased from the collected images using the image selecting terminal 50. The outputting unit outputs the images for the user to purchase.

FIG. 2 is a block diagram of the image management server 20. The image management server 20 has a character information writing unit 70, an image writing unit 80, an image collecting unit 90, a character identify unit 95, a character information obtaining unit 30, an output processing unit 100, a character information database 110, an image database 120, and an image set database 130.

Further, the image management server 20 has a position information writing unit 220, a position information database 230, an object speed detecting unit 240, an object position forecasting unit 250, and an image screening unit 300, which will be described later.

The character information writing unit 70 receives the character information obtained by the character information obtaining unit 30 and writes the character information into the character information database 110 described later.

The image writing unit 80 receives the data of the image captured by the camera system 40 and writes the data into the image database 120 described later. The attached information such as the position of the camera 40 when each of the images is captured is also written into the image database 120.

The image collecting unit 90 receives a selecting condition, which has a character ID included in the character information of the person who wants to purchase images, from the image selecting terminal 50. The image collecting unit 90 collects the images in which the person who has the specified character ID is caught, and which match with the selecting condition, from the images accumulated in the image database 120. The character information stored in the character information database 110 and the position information stored in the position information database 230 are also used for collecting the images. After the images are collected, the image collecting unit 90 transmits to the image selecting terminal 50 the collected images. The details of the collecting of the images will be described later.

An output processing unit 100 outputs the selected images appointed or selected by the user using the image selecting terminal 50 onto an appointed output medium through the outputting unit 60. For example, if paper is selected for the output medium, the output processing unit 100 prints the selected images on paper. In this case, the outputting unit 60 is a printer as shown in FIG. 1.

Here, the position information database 230, the character information database 110, the image database 120, and the image set database 130 are provided in the image management server 20, but these servers may be provided in a database server separated from the image management server. In another case, each of the databases may be a stand-alone unit.

FIG. 3 shows an example of the information stored in the character information database 110. A character ID which is assigned to each of the persons who uses the image distributing system is recorded in the character information database 110. When a group of persons uses the image distributing system, a friend ID is also recorded. The character IDs of the other persons in the group are written into the friend ID of the person. Usage of the friend ID is described later in connection with the collection of images in which a group of people is caught.

The character information database 110 stores the character information about each of the persons obtained by the character information obtaining unit 30. The character information is information for identifying each of the persons in the image recognition. For example, the character information includes a face parameter. The face parameter is a digitalized parameter which is abstracted from an outline and a size of a face, or shape and size of eyes, a nose, a mouth and so on. Other than that, the character information may include information about physical constitution such as height of each of the persons, and outfit such as clothing, glasses, and accessory each of the persons wears. There are two kinds of character information, the character information as an initial data inputted at the registration and the updated character information which is newly obtained by the updating unit 32 for the person whose character information is already obtained.

Further, the time of entering to the amusement park (or the time registered on the image distributing system) is recorded for each of the characters.

Furthermore, a position of the person who is the target character at a certain time is recorded as position information when the character is caught in an image captured by the camera system 40 so that the position of the person is identified. The position information is also sent to and stored in the position information database 230 shown in FIG. 2.

Some of the persons playing in the amusement park set the restriction that an image having a specific person in it should not be captured, collected, or outputted so that no other person may obtain the images in which the specific person is caught. Whether this restriction is set or not is also recorded in the character information database 110.

FIG. 4 is an explanatory diagram of the image database 120. The image database 120 stores data of the images captured by one of the plurality of cameras included in the camera system 40 and transmitted to the image management server 20. The images captured by the camera system 40 are transmitted to the image database 120 when a predetermined number of the images are accumulated in the camera, when a predetermined time interval is past, or substantially every time an image is captured. An image ID to identify the image is allocated to each of the stored images. Each of the images also has an image capturing property about the captured image such as a camera ID allocated to each of the cameras capturing images and the position information including the place where and the time when the image is captured. When the subject person in the image is identified by the image collecting unit 90, the character ID of the identified person is also recorded in the image database 120 for each of the images.

The image database 120 enables identification of each of the images. The image database 120 also enables reference of each person caught in each of the images and the capturing property when and where each of the images is captured.

FIG. 5 is an explanatory diagram of the image set database 130. The image set database 130 is a database of a plurality of images having the same person. The image set database 130 is used when the plurality of images is managed as an image set rather than separately in a case such as the same person or the same group of persons is caught in the plurality of images. There are two types for the image set; an angle set and a chronological set. The angle set includes a plurality of images catching the same objects from cameras set in a plurality of different angles at substantially the same time. The other one, the chronological set, includes a plurality of images catching the same objects as time passes. The camera capturing the chronological set may be a single camera or a plurality of cameras.

The image set database 130 enables effective management of a plurality of images in which the same person is caught. The image set database 130 is used for collecting or screening the images and identifying characters caught in the images.

Figure 6:
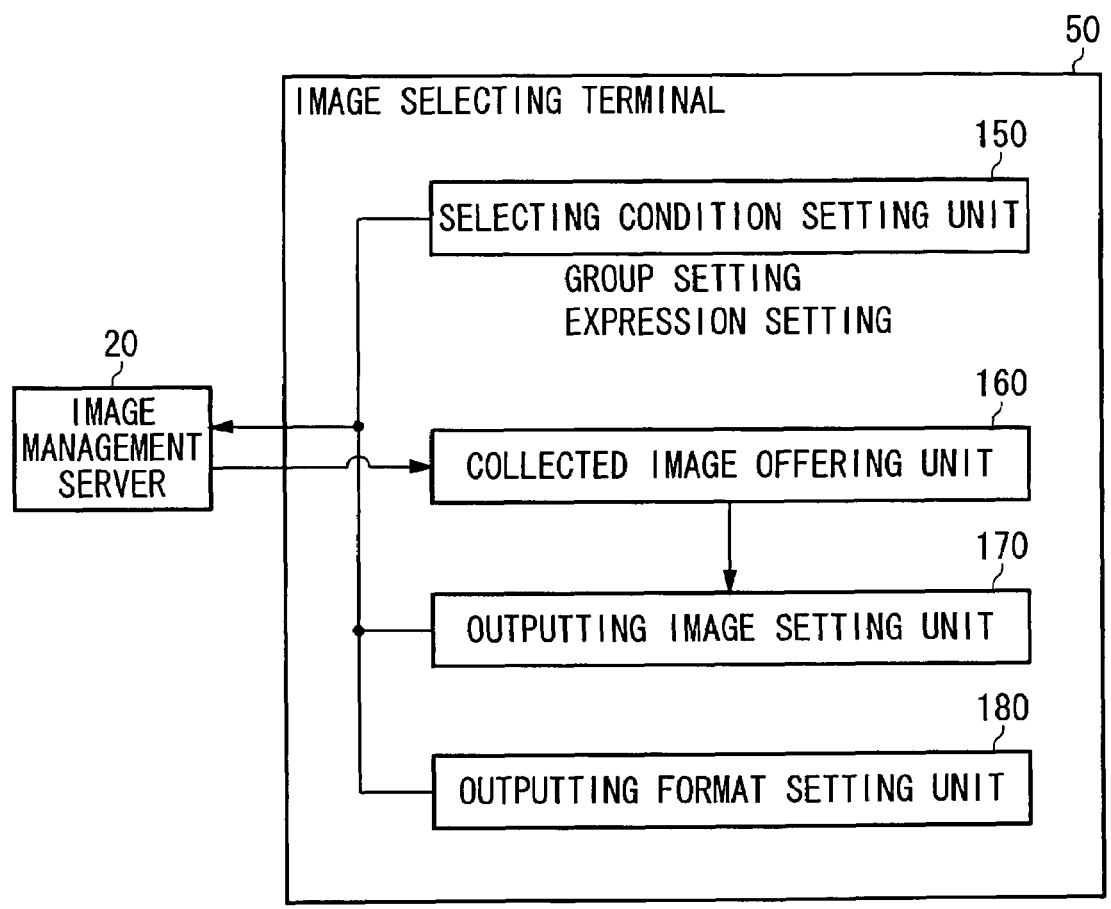
FIG. 6 is a block diagram of the image selecting terminal 50.

FIG. 6 is a block diagram of the image selecting terminal 50. The image selecting terminal 50 has a selecting condition setting unit 150, a collected image offering unit 160, an outputting image setting unit 170, and an outputting format setting unit 180.

The selecting condition setting unit 150 sets a selecting condition for selecting a desired image from the images stored in the image management server 20. The selecting condition includes the character ID of the person and a condition such as the person has a predetermined specific facial expression, for example, smiling and so on.

When a group of persons visits the amusement park, pictures taken with other members in the group are preferred for souvenirs. To meet this need, the selecting condition that such a predetermined plurality of persons is caught in the same image is set by the selecting condition setting unit 150. For example, when "Both Ms. A and I are caught in an image" is set for a selecting condition, the images in which Ms. A and the selecting person are caught are collected based on the character information of Ms. A and the selecting person including the friend ID. When the character information is recorded on the ID card in the form of a bar code and the user carries around the ID card, the selecting condition setting unit 150 has a bar code reader and reads in the character information. In another case, the selecting condition setting unit 150 has a camera system and verifies the person purchasing the images, so that the images are distributed only to the target character themselves.

The selecting condition which is set in the selecting condition setting unit 150 is transmitted to the image management server 20.

The collected image offering unit 160 receives from the image management server 20 a list of the images matching with the above described selecting condition and displays the received images on a monitor for the user's selection.

The outputting image setting unit 170 sets up information of images to be outputted which are selected from the images offered by the collected image offering unit 160. The user selects the images to purchase, and the information as to which images are to be purchased is sent to the image management server 20.

The outputting format setting unit 180 sets up information of a medium on which an image is to be outputted. Paper, CD-R, and MD may be selected for the medium on which the image is to be outputted. In another case, the outputting may be offered as image data on the Web, or by sending image data in a file attached to E-mail. The user selects the outputting medium, and the choice of the user is sent to the image management server 20.

Character identification in an image set is one distinguishing facility included in the image management server 20. A character identifying unit 95 processes character identification in the image set. The character identifying unit 95 enables identification of a plurality of persons as a group when there is a plurality of images with the same persons caught therein. When each of the characters in the group is identified in one of the plurality of images and one of the characters in the group is identified in the rest of the plurality of images, the rest of the persons or characters in the group, who are caught in the rest of the plurality of the images, are also identified without individually identifying each person of the rest of the plurality of persons. How to identify persons in the image set will be described in the description of the image set database 130 by referring to FIGS. 7(A) to (C) and FIG. 8.

Figure 7A:
FIGS. 7A, 7B, and 7C show a configuration of an identification process using the image set executed by the character identification unit 95.
Figure 7A:

FIG. 7(A) shows a configuration of the identification process using the angle set executed by the character identification unit 95. Here, an angle set A1 contains the images having IDs 11, 12, 13, 14, and 15, and a same target character X (not identified yet) is common to each of the images. When the character X caught in the image having ID 11 is identified as the target character with ID 19, the same X target characters caught in the images having IDs 12 through 15 are also identified as the common target character with ID 19 for this angle set A1.

Figure 7B:
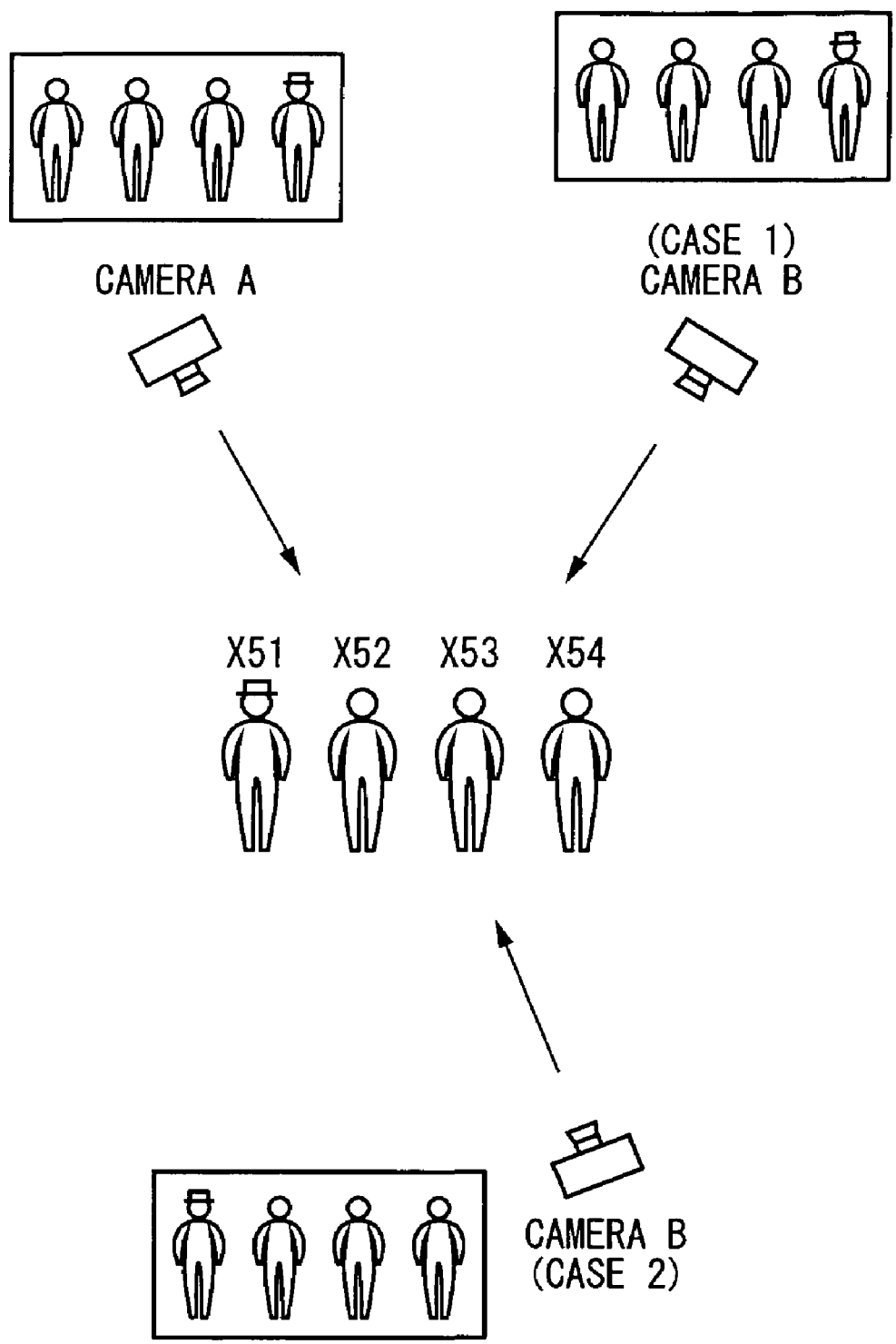
Figure 7C:
Figure 7C:
Figure 7C:

Next, when a plurality of characters is caught in each of the images, how the characters are identified will be described. FIG. 7(B) shows a configuration of the verification process of a plurality of persons. FIG. 7(C) shows a configuration of the identification process of the plurality of persons. The angle set A2 includes a plurality of images, and in each of the plurality of images a common group having the same four persons X51, X52, X53, and X54 is caught. Each of the persons (X51–X54) is identified in one of the plurality of images, of which the image ID is 51, captured by camera A in an angle set A2. Camera B, another camera included in the angle set A2, also captures the group of the same four persons (X51–X54) in an image of which the image ID is 52. When the angle between an optical axis of the camera A and an optical axis of the camera B is less than 180 degree (case 1 in FIG. 7(B)), the person at the left end of the four, for example, in the image having ID 52, captured by camera B, is identified as the person X51, and verified as the identified character at the left end of the four persons (X51–X54) in the image having ID 51 captured by the camera A. When the angle between the optical axis of the camera A and the optical axis of the camera B is 180 degree or more (case 2 in FIG. 7(B)), the person at the right end of the four persons in the image 52 captured by camera B is identified as X51, and verified as the identified character X51 in the image (ID 51) captured by the camera A. The position of the person to be verified is any position of one person in the group, but when the number of persons included in the group is odd, the center of the group does not move, therefore, the center position is convenient for verification. As shown in FIG. 7(C), if the verified person is identified, the rest of the persons included in the group caught in the rest of the plurality of images in the angle set A2 are identified as the rest of the persons in the group.

Figure 8:
FIG. 8 is an explanatory diagram of the identification process using the chronological set executed by the character identification unit 95.
Figure 8:

FIG. 8 is an explanatory diagram of the identification process using the chronological set executed by the character identification unit 95. Here, an angle set T1 contains the images having IDs 21, 22, 23, 24, and 25, and a same character Y (not identified yet) is common in each of the images. When the character Y, caught in the image having ID 21, is identified as the character having ID 29, all the other Y characters caught in the remaining images having IDs 22 through 25 are also identified as the character having the common ID 29 for this angle set T1.

Thus, without repeatedly identifying the same characters caught in each of the images, the identification of characters caught in the images included in the image set is executed effectively.

A camera included in the camera system 40, for example, captures images automatically in a predetermined time interval. In this case, an image without any character or an image in which a person who does not want to register character information that is caught may be captured. The image screening unit 300 selects and deletes the images captured by the camera 40 so as to omit these images.

Figure 9:
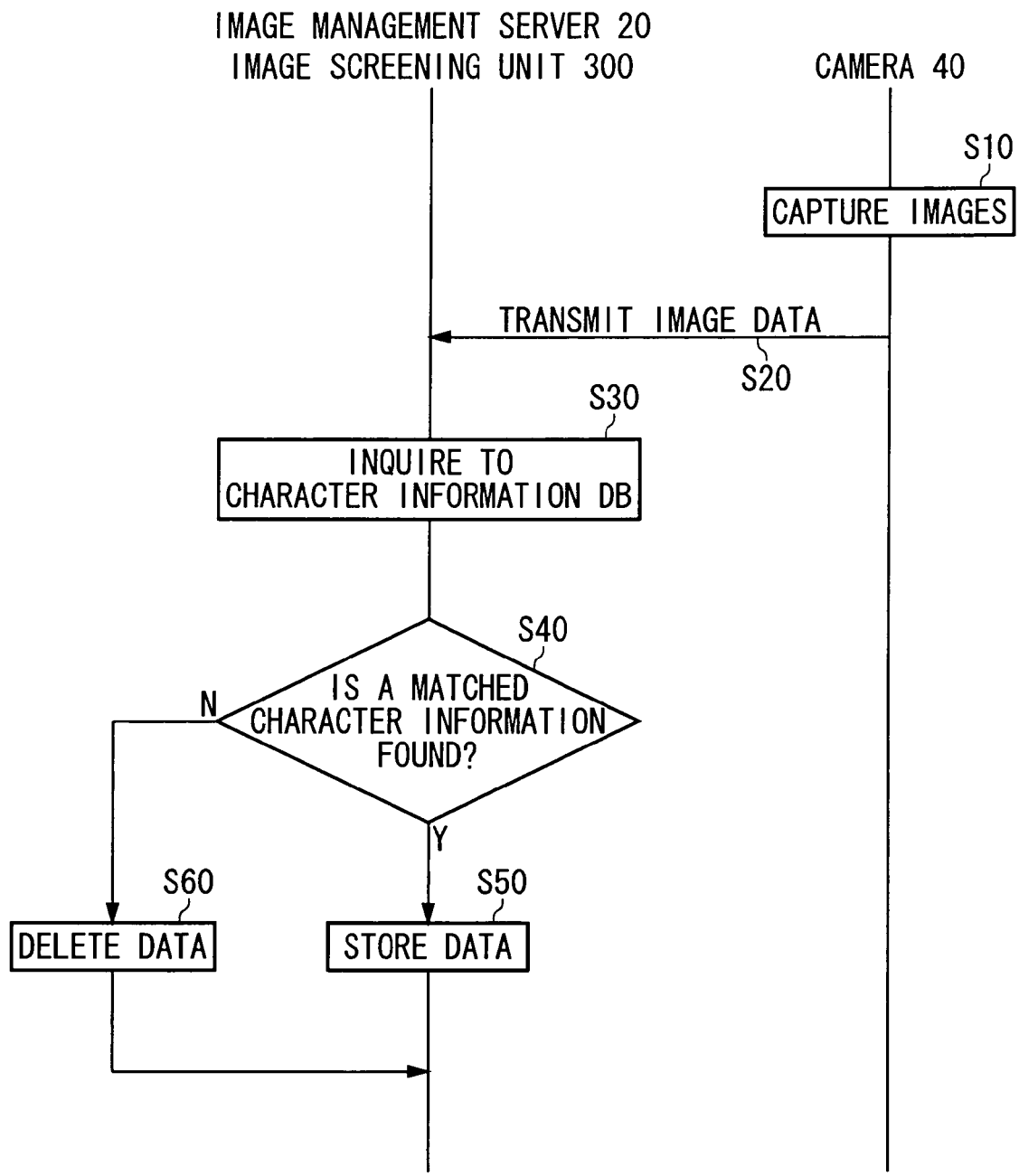
FIG. 9 is a sequence chart for selecting and deleting excessive images captured by the camera 40, executed by the image screening unit 300.

FIG. 9 is a sequence chart indicating selecting and deleting of the excessive images captured by the camera 40 executed by the image screening unit 300. First, the camera system 40 captures an image (S 10). The data of the captured image is transmitted to the image management server 20 (S 20). The image screening unit executes the image recognition process on the transmitted image, and verifies the persons caught in the image with the character information registered in the character information database 110 (S 30). Whether at least one person who matches with the character information registered in the character information database is included in the image is judged (S 40). When a registered character is included in the image, the image data is saved into the image database 120 (S 50). On the other hand, an image without any of the registered characters is deleted (S 60). The deleting processing enables not to save images without the registered character into the image database 120, so that the load for image collecting which is to be processed later is relieved. Though not shown in the figure, a verification degree, which indicates a degree of matching between the registered character and the character caught in the image, is defined. A boundary of the verification degree to save the image is not limited to 100%. For example, when the boundary of the verification degree is set 50% and the verification degree of the captured image is 50% or more, the image is saved into the image database 120. In this case, the number of the saved images is increased, though a possibility of missing an image in which the character is caught is decreased.

The above described example is preferable when the character information is previously registered. On the other hand, when the character information is obtained after the image capturing, the image screening unit 300 checks if any person is caught in the image transmitted from the camera system 40. When at least one person is caught in the image, the image is saved to the image database 120. When the character information is registered at the image selecting terminal 50, the image collecting unit collects the images in which the person with the registered character information is caught. The images in which the person is caught are sent to the image selecting terminal 50. Applying this processing, without registering the character information previously, the images in which the person matching to the character information is caught, are collected from the images with the unidentified persons stored in the image database 120 when the character information is registered at the image selecting terminal 50.

If the camera system 40 captures images, for example, in a predetermined time interval without concerning a facial expression of the character, the captured images may include many images with an unwanted facial expression captured at improper timing. Improper timing not only increases the images to be searched so that increases the time for collecting, but also offers images captured in an undesired timing to the user. Thus, it is more preferable for the camera system 40 to include a timing detecting, which is a mechanism for automatically capturing images in a proper timing. The timing detecting will be described referring to FIG. 10 and FIG. 11.

Figure 10:
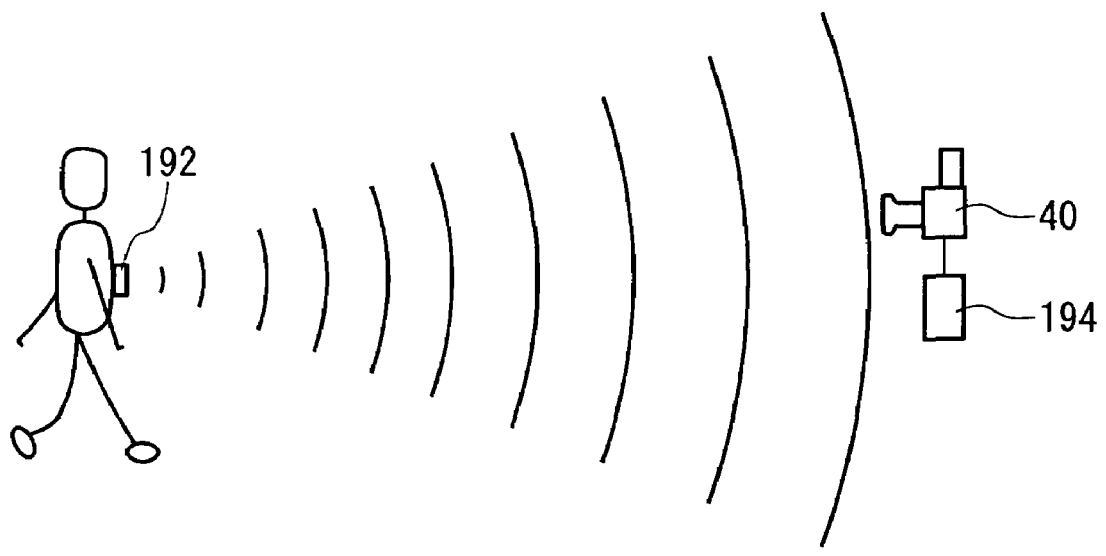
FIG. 10 shows how the position of a character is located.

FIG. 10 shows how the position of a character is located. The person carries around a transmitter 192 which transmits radio waves. A receiver 194 is connected to the camera system 40. The receiver 194 receives the radio waves transmitted from the transmitter 192 and detects strength of the radio waves. Distance between the character and the camera system 40 is calculated based on the strength of the radio waves. When a timing detecting unit 140, which is not shown in the figure, connected to the camera system 40 detects that the calculated distance becomes a predetermined distance, the camera system 40 captures an image. The person is caught in the image properly.

At least one of the radio waves transmitted from the transmitter 192 and a region where the receiver 194 receives the radio wave preferably have directivity. The directivity enables detection of the position of the person with higher accuracy so that the timing for capturing an image is detected more properly.

The radio waves transmitted from the transmitter 192 preferably include character information to identify the person who carries the transmitter 192, so that the person caught in the image is identified based on the character information included in the radio waves when the camera system 40 captures the image. When the person is identified, the character information such as the character ID of the character caught in each of the images is recorded into the image database 120. When the images in which the person is caught are searched, by the image collecting unit 90 or a character identify unit 95, described later, from the image database 120, as shown in FIG. 2, based on the character information or the character ID of the character to be searched, the image data in which the character is caught is searched infallibly and rapidly from the image database 120.

Each of the persons in the amusement park may have the transmitter 192 and the transmitter 192 may transmit the character information of each person who wants to purchase the images or information that the person refuses to have their image captured. In this case, the receiver 194 receives the information that the person refuses to be imaged so that the camera system 40 judges that the person who refuses to have their image captured is in the predetermined area, and the camera system 40 stops capturing images so that images in which the person who refuses to have images captured are not caught.

Figure 11:
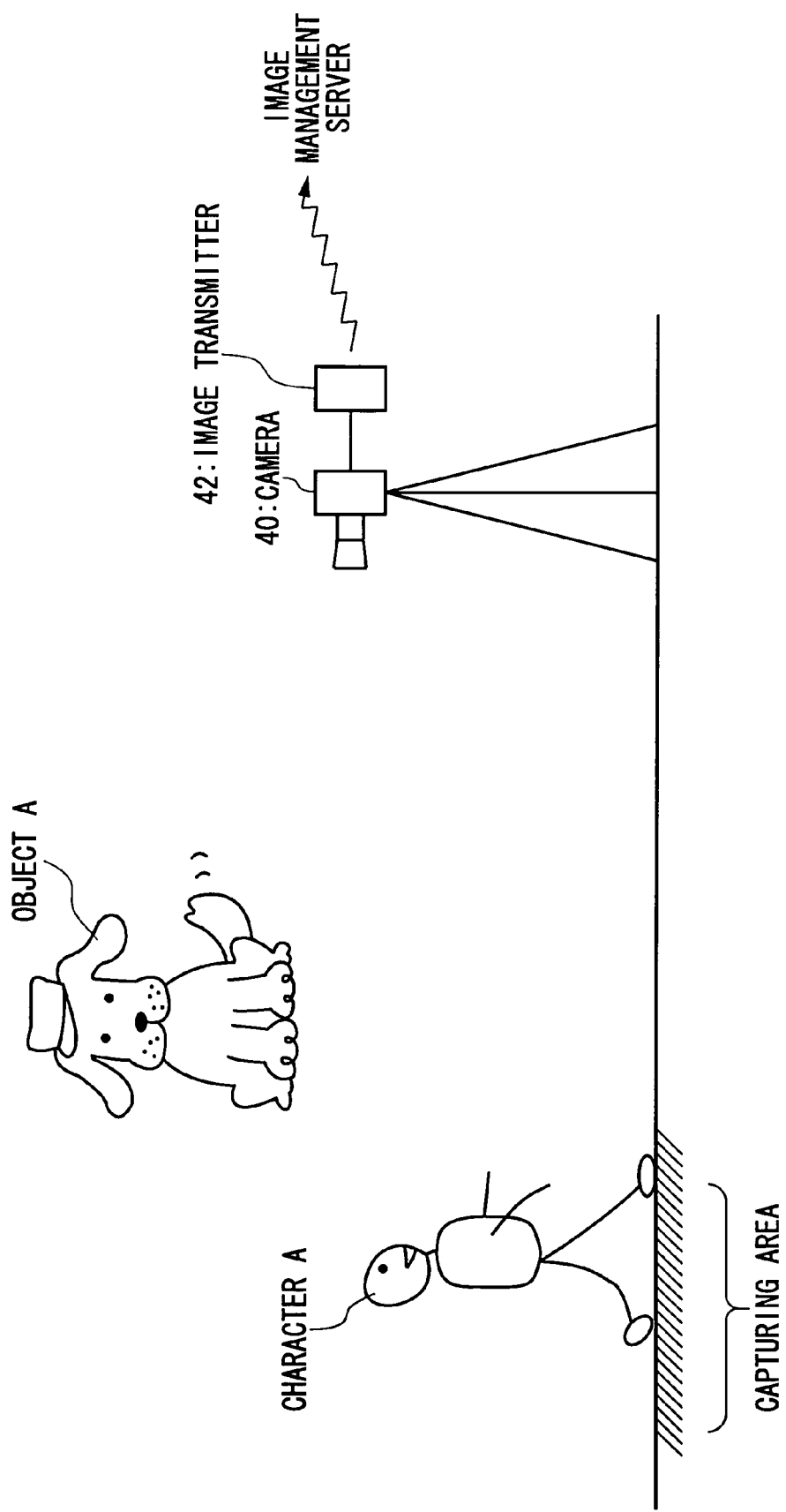
FIG. 11 is an explanatory diagram of a detection of an image capturing timing when a certain object and a person with character A are in a predetermined location.

FIG. 11 is an explanatory diagram of a detection of an image capturing timing when a certain object and a person with character A are in a predetermined location. When an object A and a person with character A are in a predetermined capturing area, the camera 40 captures an image. A detection of the position in a predetermined image capturing area of the object A is also performed by the above described transmitter and the receiver. Thus, the image catching of the character A with the surprised or pleased facial expression in response to the object A is properly captured.

Figure 12:
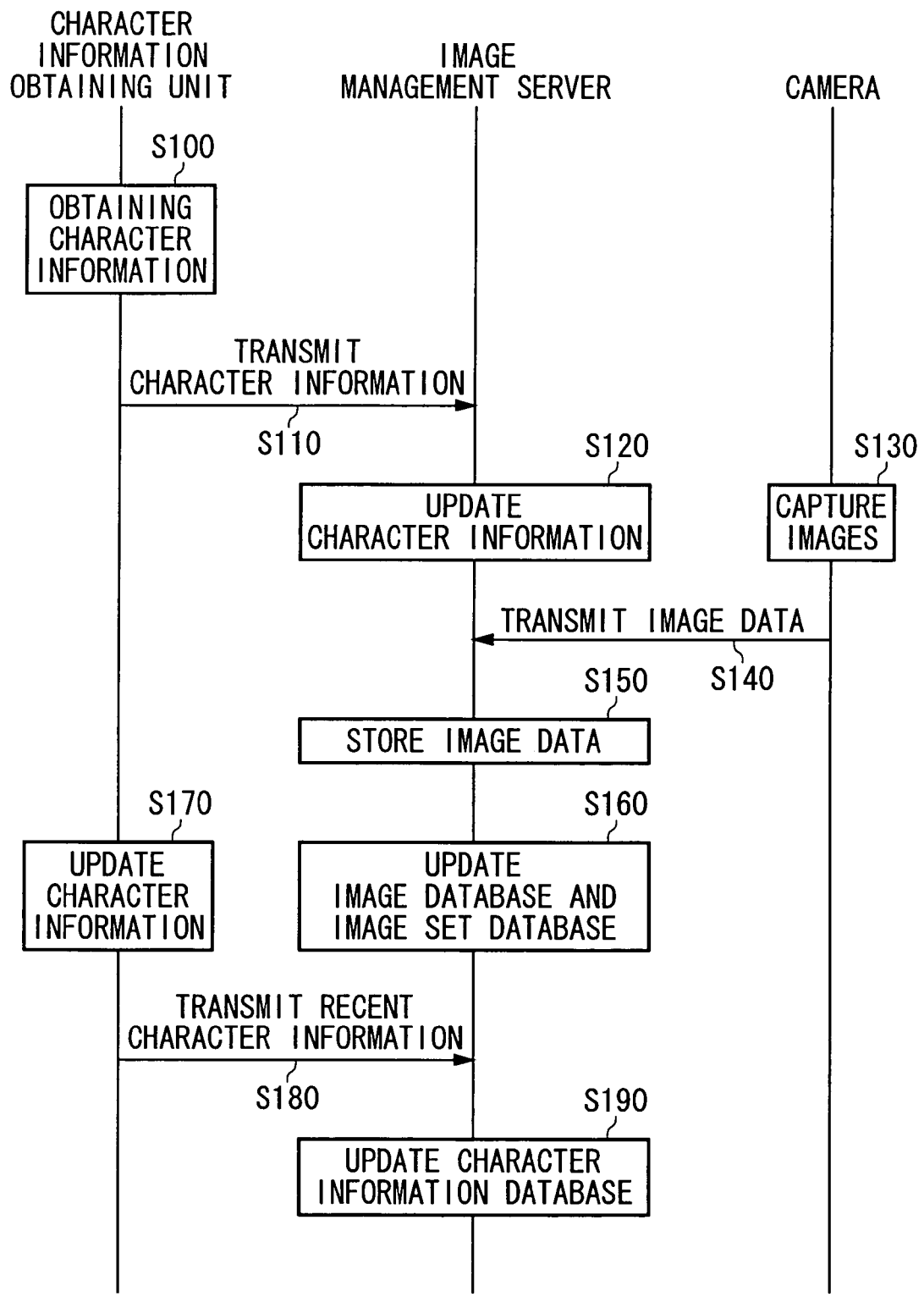
FIG. 12 is a sequence chart indicating data interaction between the image management server 20, the character information obtaining unit 30, and the camera included in the camera system 40.

FIG. 12 is a sequence chart indicating data interaction between the image management server 20, the character information obtaining unit 30, and the camera included in the camera system 40. First, the character information of each person is obtained by the character information obtaining unit 30 (S 100). Here, images are captured for identifying each person, and parameters indicating characteristics of each person's body, face, and outfit are digitized so that the characteristics are transformed into the character information. The character information is transmitted to the image management server 20 (S 110) and sent to the character information database 110 (not shown in the figure). The character information database 110 is updated based on the transmitted character information (S 120). Here, the character ID allocated to each of the persons may be recorded into an ID card carried by the person. In another case, the character ID may be notified to the person. Thus, each of the persons is identified with the character ID. On the other hand, the camera 40 captures images with unidentified characters (S 130). The images may be captured at a predetermined time interval, at a random interval, or at an automatically predetermined timing, as described above. When the camera 40 captures an image, the captured images are transmitted to the image management server 20 (S 140). The transmitted images are stored in the image database 120 (S 150). An image ID for identifying each of the images is allocated to the images, and the image database 120 is updated. When the transmitted images are included in an image set, the image set database is also updated (S 160).

When new character information is obtained about the character whose character information has already been obtained (S 170), the character information obtaining unit 30 transmits the more recent character information to the image management server 20 (S 180). For example, when the person takes out his or her contact lens and puts on eyeglasses, the facial image of the person is changed; or when he or she buys a hat and wears it, the character information about his or her body is changed. The character information database is updated based on the more recent character information (S 190). Thus, when the character information about a certain person is changed while he or she is in the amusement park, the person may still be identified.

Figure 13:
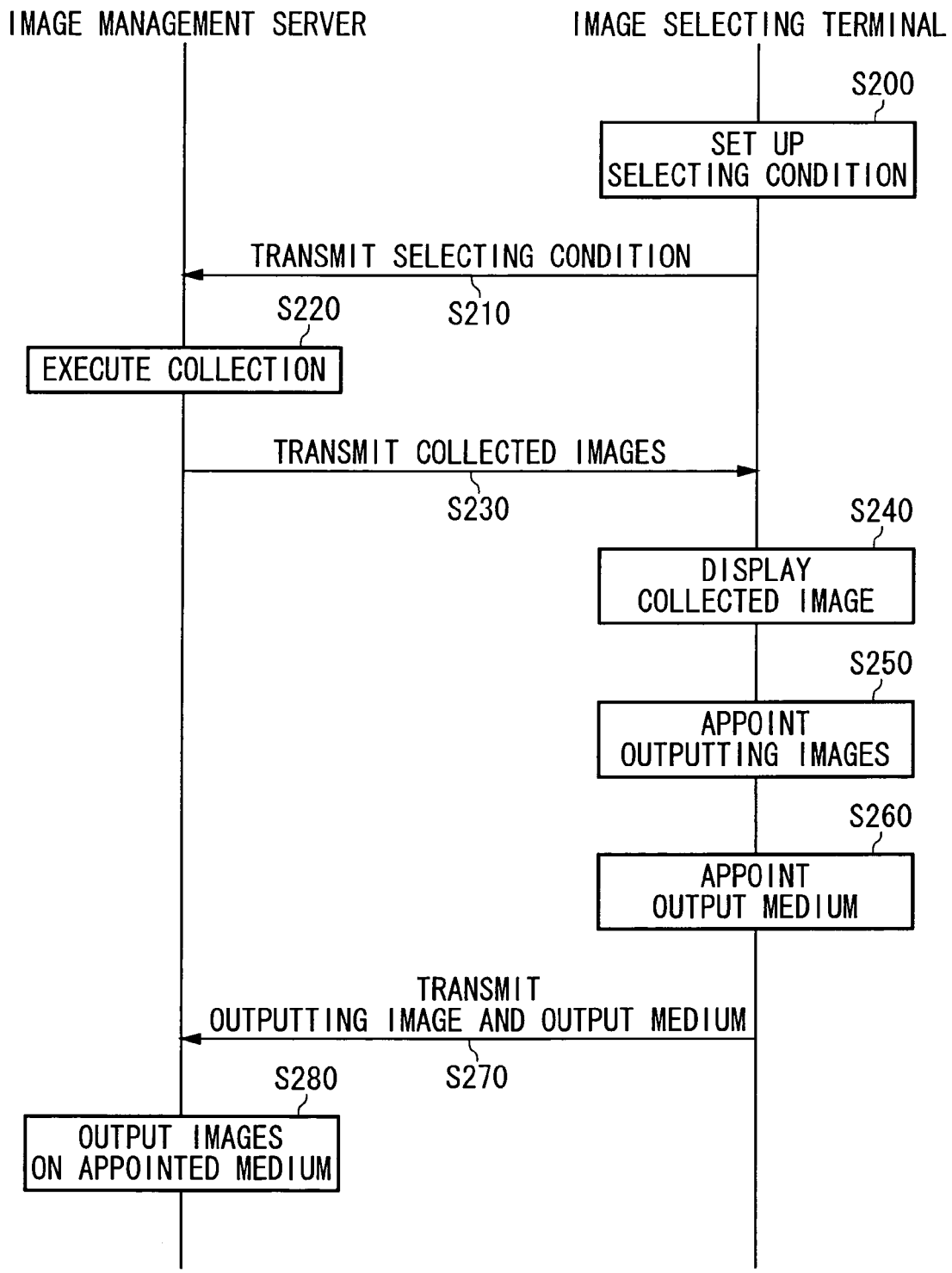
FIG. 13 is a sequence chart indicating data interaction on the image searching process between the image management server 20 and the image selecting terminal 50.

FIG. 13 is a sequence chart indicating data interaction on the image searching process between the image management server 20 and the image selecting terminal 50. First, a selecting condition for collecting images is set up in the image selecting terminal 50 (S 200). The selecting condition includes the character ID of the user and a search condition, such as a plurality of predetermined characters is caught, a certain facial expression, for example, a smile is caught, and so on. The selecting condition is transmitted to the image management server 20 (S 210). The image collecting unit 90 in the image management server 20 searches the images stored in the image database 120 based on the transmitted selecting condition (S 220). For searching the images, the character information in the character information database is also employed. When the search is finished, the images in which the person with the character ID is caught and which match with the search conditions are collected, and the collected images are transmitted to the image selecting terminal 50 (S 230). The collected images are displayed on the image selecting terminal 50 (S 240). The user selects and appoints images he or she wants to purchase from the collected images displayed on the image selecting terminal 50 (S 250). The user also selects and appoints a medium for output of the images (for example, paper, CD-R, and MD) (S 260). Information about the images to be outputted and the output medium selected by the user is transmitted to the image management server 20 (S 270). The image management server 20 outputs the appointed image on the appointed medium (S 280).

FIG. 14 shows an example of information indicated on the image selecting terminal 50 when the user inputs the selecting condition to the image distributing system. First, the user inputs the character ID allocated by the system. Next, the user sets the search condition to select the images. The selecting condition is, for example, selecting such images that only the user is caught in by himself or herself, or certain characters and the user are caught in. Furthermore, a facial expression in the image is appointed to the selecting condition, for example, eyes of the characters in the image are not closed, the person in the image is smiling, and so on.

In another case not shown in the figures, the user may set a lower limit for the verification degree between the registered character information and the character included in the images to be collected. For example, if the lower limit of the verification degree is set at 50%, the images of which the verification degree is more than 50% are selected. When the collected result is offered to the user, the images are preferably offered in the descending order of the verification degree, so that the user chooses the images he or she wants to purchase from the offered images conveniently.

FIG. 15 shows an example of a collected image list and output setting information indicated on the image selecting terminal 50. First, the list of collected images based on the selecting condition appointed by the user is offered. The images on the list are preferably in a thumbnail format, which arranges reduced size images in a grid pattern, so that what is caught in each of the images is easily displayed to the user. Watching the information indicated on the selecting terminal 50, the user checks the offered images. The user selects the images to be outputted from the list of offered images.

The user also selects a medium on which the chosen images are to be outputted. The medium to be used for image distributing is chosen from at least one of following: paper (printing out the images on paper), CD-R (writing the images into a CD-R), MD (writing the images into an MD), the Web (the image data is distributed at a predetermined URL on the Web and the user downloads the distributed image data by accessing the predetermined URL), and attaching to an E-mail (the images are sent to an E-mail address appointed by the user attached to an E-mail). Furthermore, the user may select outputting condition of the images such as size, picture quality, color tone, and brightness.

Charge amount for the distributed images, which depends on the number of images that are selected by the user and choice of the output medium, is also indicated as a part of the information. The user selects the number of images to be outputted depending on his or her budget, so that the system becomes more user-friendly.

The user, after confirming the settings about the image outputting, selects "purchase", and prompts the system to output the appointed images.

The outputted images (except when distributing on the Web or by attaching to an E-mail) may be handed to the user at the place, or may be delivered to where the user decides. If the user expects to look at the images at once, the images are handed to the user immediately. If the user does not want to carry around the outputted images or expects to look at the images later, the images are properly delivered to the user. The user chooses the preferred delivery.

Next, an image searching system, which is advantageous for the image searching executed in the present embodiment, will be described. The image searching system employs the character positioning unit 210, shown in FIG. 1 and FIG. 2, and the position information writing unit 220, the object speed detecting unit 240, the object position forecasting unit 250, and the position information database 230, which are shown in FIG. 2. The image searching system is applied to the image collecting unit 90, the image identifying unit 95, and the image screening unit 300. Here, for example, a case in which the image collecting unit 90 collects images from the image database 110 is described.

The character positioning unit 210 identifies a character and obtains position information. The position information is information about a position or location of the character at a certain time. The character positioning unit 210 is connected to communicate with the image management server 20. The obtained position information of the character is transmitted to the image management server 20. When a plurality of characters are targets, the character positioning unit 210 obtains not only positions of each of the characters, but also relative positions between each of the characters. An example of the character positioning unit 210 will be described later.

The position information writing unit 220 receives the position information about each of the persons obtained by the character positioning unit 210 and writes the position information into the position information database 230.

The position information database 230 stores position information, that is, the position or location where each of the persons is at a certain time, which is obtained by the character positioning unit 210. An example of the position information database 230 will be described later.

The object speed detecting unit 240 refers to the times when each of the persons passes two points on a predetermined route, which are stored in the position information database 230. Based on the distance between these two points and the time period to travel between these two points, the speed of movement of each of the characters is calculated. In another case, the character positioning unit 210 has a speed sensor, and the object speed detecting unit 240 detects a speed of each of the characters directly from the character positioning unit 210.

The object position forecasting unit 250 forecasts, based on the speed of each of the characters calculated by the object speed detecting unit 240, where a certain person will be on a predetermined route after a certain period has elapsed since the person passed a predetermined point.

Examples for the character positioning unit 210 and the position information database 230 will now be described here. After this description, an example of image searching for the person by the image collecting unit 90 employing the position information database 230 will be described.

Figure 16:
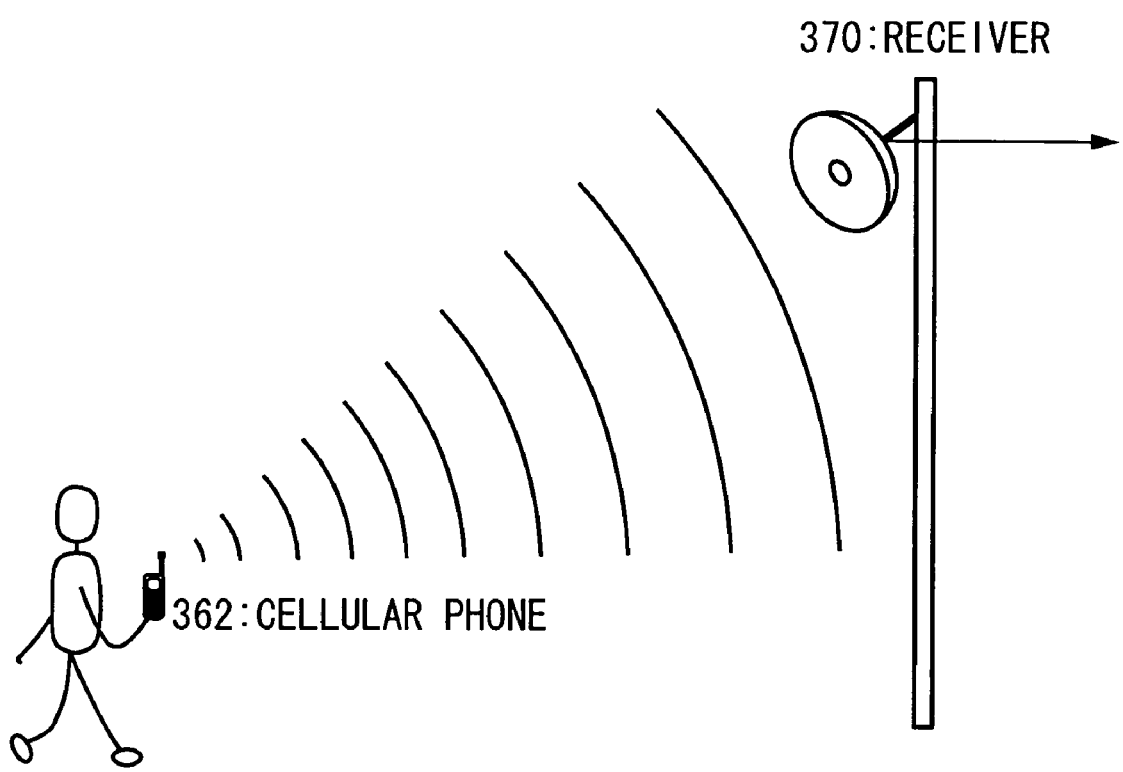
FIG. 16 is an explanatory diagram for the character positioning unit 210 obtaining the position information.

FIG. 16 is an explanatory diagram of the character positioning unit 210 obtaining the position information. The person carries around a wireless communication means, for example, a cellular phone 362 or a PHS. In another case, the ID card may include a transmitter. The transmitter in the ID card transmits the character information about the person who carries the ID card. The character positioning unit 210 has a receiver 370 which receives radio waves transmitted from the cellular phone or the ID card transmitter, and the system locates the position of the person using the radio waves received by the receiver 370.

Figure 17:
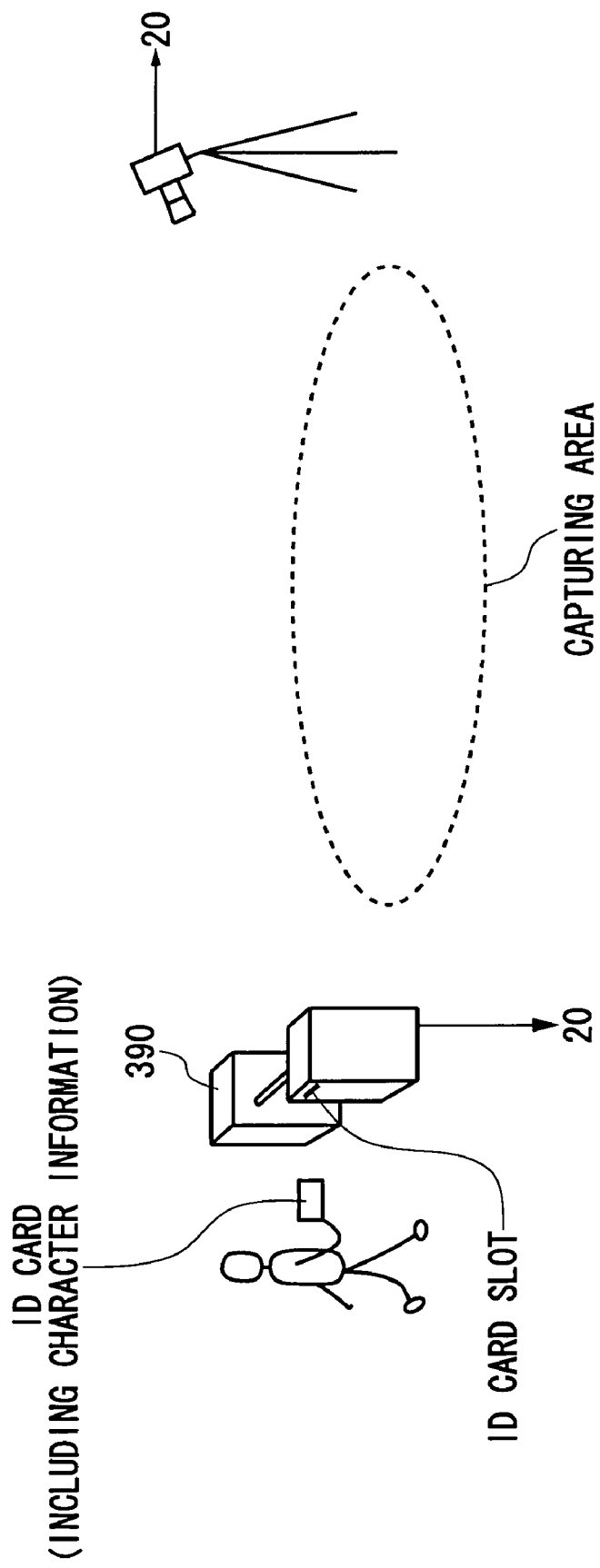
FIG. 17 shows another example of the character positioning unit 210.

FIG. 17 shows another example of the character positioning unit 210. The person carries around the ID card on which ID information to identify the person is recorded. When the person goes into an amusement facility, the person inserts the ID card into an ID card slot provided at the gate 390. An ID information reader reads the ID information recorded on the ID card. When the ID information is read, the location of the gate 390, the time the person passes the gate 390, and the ID information to identify the person recorded on the ID card are sent to the character positioning unit 210, and then transmitted to the position information database 230 in the image management server 20 and stored. The character information may be the information about who refuses to have images captured and who registers a restriction such that the others may not obtain his or her images. The ID card may record the character information in a form of bar code, and the ID card reader may be a bar code reader.

Figures 18, 19:
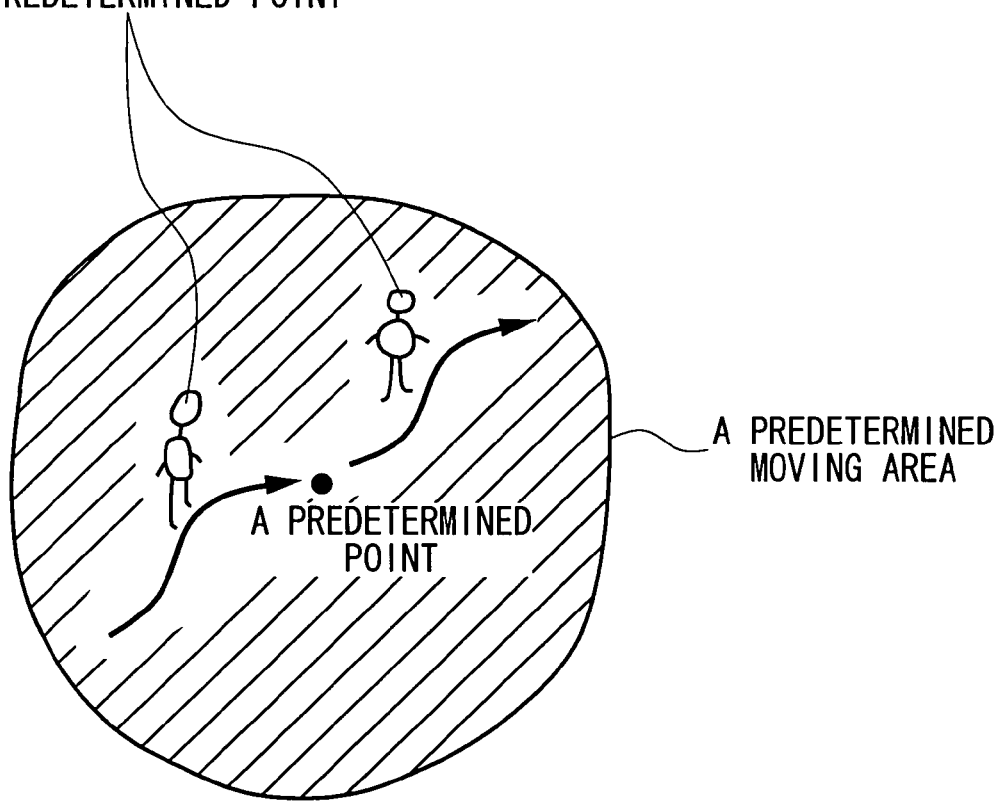
FIG. 18 shows an example of information stored in the position information database 230.
FIG. 19 is an explanatory diagram of an example of collecting images in which a person who passes a predetermined point is caught.

FIG. 18 shows an example of information stored in the position information database 230. FIG. 18 is an example of the position information database 230 showing information about a certain person (the character ID to identify the person is, for example, 1) in a table. The table records the position information of the positions at certain times about the character ID 1 obtained by the character positioning unit 210.

The position information recorded in the position information database 230 is used when the image collecting unit 90 collects images in which a certain person is caught from the image database 120, the character identifying unit 95 searches images in which the same plurality of persons are caught from the image set database 130, the image screening unit 300 screens the images transmitted from the camera system 40, and the timing detecting unit 140 detects the image capturing timing. Here, for example, the image collecting unit 90 which collects the images in which a certain person is caught from the image database 120 will be described. The image collecting unit 90 refers to the position information database 230 and obtains position information of the person. Using this position information, the system narrows the number of the images to be searched in which the person is possibly caught. For example, when position information of the person whose character ID is 1 positioned on point P at a certain moment is reported, the images captured by the camera 40, which captures images around the point P, and captured at the moment are selected as candidates for the images having the character ID 1 caught therein. Images captured by cameras provided at places other than the point P around the moment are not necessarily searched for collecting images with the person (character ID 1) caught therein. Thus, the collecting time for collecting images in which a certain person is caught from the plurality of images in which unidentified characters are caught is shortened.

FIG. 19 is an explanatory diagram of an example of collecting images in which a person who passes a predetermined point is caught. If it is confirmed that a certain person passes a predetermined point at a certain moment, the position the person may be at is limited to a predetermined moving area for a predetermined period before and after the moment. Therefore, the character positioning unit 210 obtains position information that the person passes the predetermined point and records the position, that is place and time, into the position information database 230. The image collecting unit 90 searches only those images captured in the predetermined period of time and the predetermined moving area which is calculated based on the time the person passes the predetermined point and the time length from the moment of passage. If a person passes the predetermined point at 2 pm, the period to be searched is, for example, set as 1:45 pm through 2:15 pm. The moving area where the person may play during 1:45 pm through 2:15 pm (hatched part in FIG. 19) is the predetermined moving area. The images captured by the camera 40 provided in the predetermined moving area (hatched part in FIG. 19) in the period 1:45 pm through 2:15 pm are searched for the images the person may be caught in. Here, the predetermined moving area of the persons is calculated from paths around the predetermined point and an average speed at which persons usually move. Thus, the more the period to be searched is shortened, the smaller is the predetermined moving area of the person to be searched.

Figure 20:
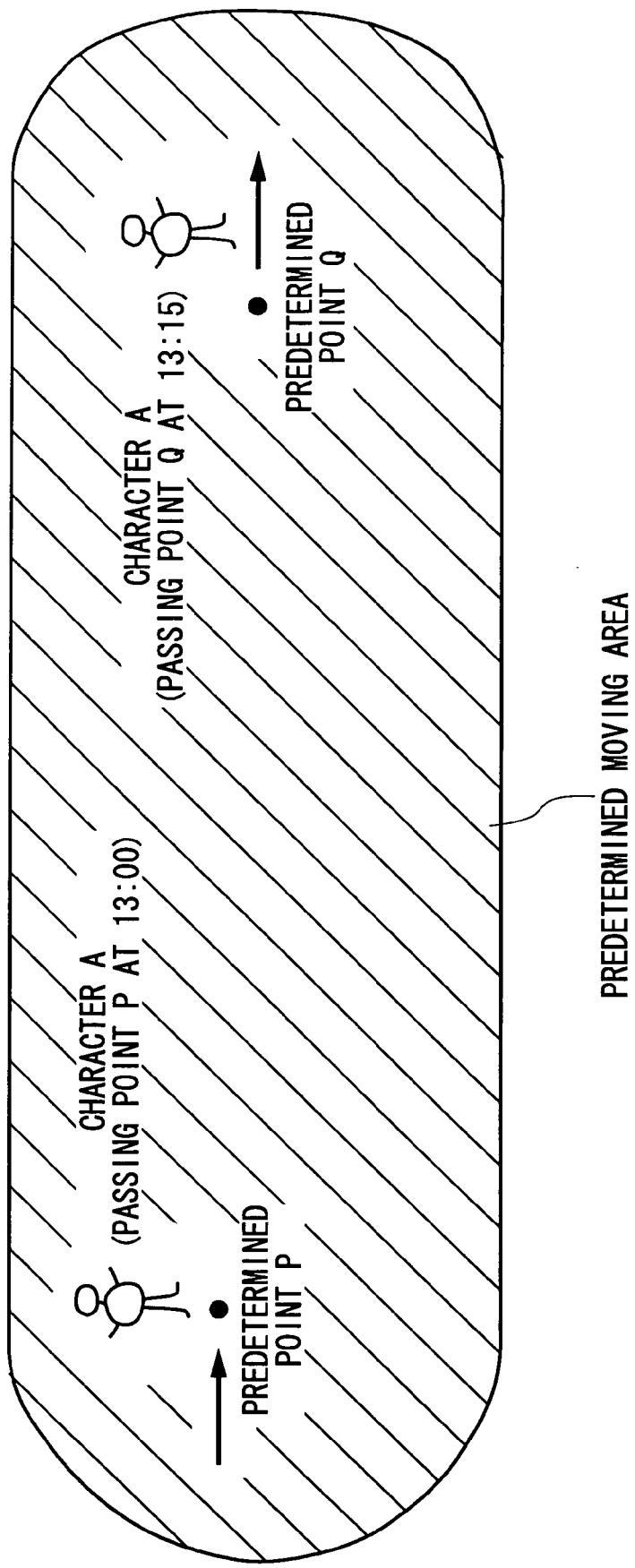
FIG. 20 is an explanatory diagram of an example of collecting the images in which a person who passes two different points is caught.

FIG. 20 is an explanatory diagram of an example of collecting the images in which a person who passes two different points is caught. There is a plurality of routes between the predetermined point P and the other predetermined point Q. Here, the character positioning unit 210 detects that the person passes the predetermined point P and the other predetermined point Q. The image collecting unit 90 limits the images to be searched in such a case to the images that are captured by the camera system 40 in a predetermined moving area which is calculated from the times when the character passes the point P and the point Q and the route around the point P and point Q. For example, the character positioning unit 210 detects that the character A passed the point P at 13:00 and next passed another predetermined point Q at 13:15. In this case, the image collecting unit 90 searches for the images in which the character A is caught in the images captured by the camera system 40 provided in the moving area calculated based on the position P and the period 13:00 and the position Q and the period 13:15 (hatched part in FIG. 20). Here, the predetermined moving area of the person is calculated from the time when the person passes a predetermined point P and the time when the person passes the predetermined point Q, routes around the point P and the point Q, and the speed of an average person who is playing around so that the moving area covers the range where the person would usually move around.

Furthermore, the image collecting unit 90 has means for collecting images in which the person is caught when the person goes along a predetermined route. The image collecting along the predetermined route will be described now.

Figure 21:
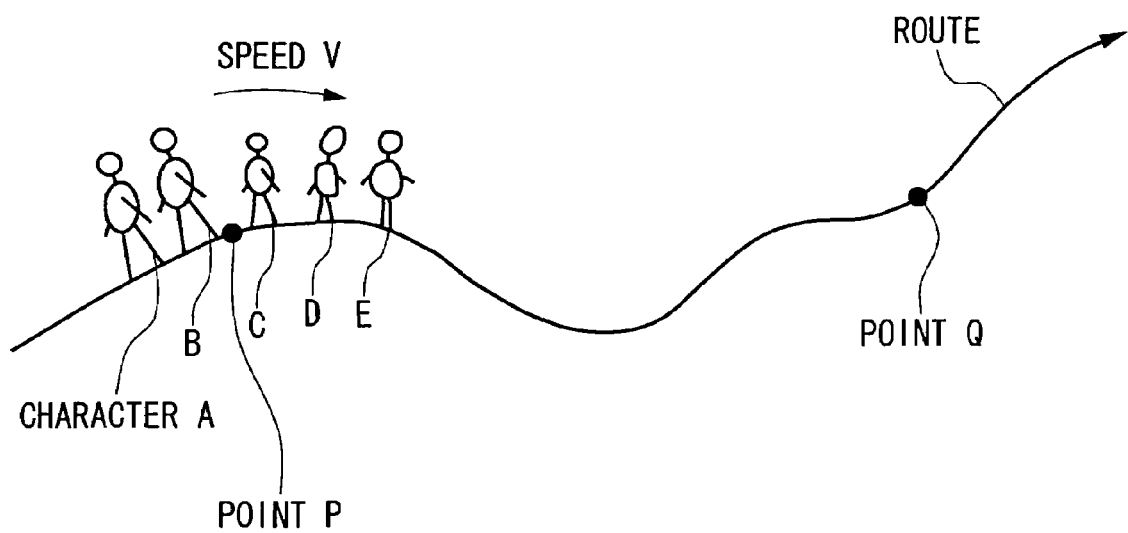
FIG. 21 is an explanatory diagram of an example of identifying the position of persons on a predetermined route.

FIG. 21 is an explanatory diagram of an example of identifying the position of the persons on a predetermined route. The persons go along a predetermined route. The predetermined route is, for example, a route in an attraction provided in the amusement facility, a route provided in an aquarium, and so on. When a plurality of persons go in a row along the predetermined route, the sequence of the plurality of persons seldom changes.

(When One Person Goes Along the Route)

The character positioning unit 210 is provided at a predetermined point P. Here, the position information of the person is obtained at the point P. Using the obtained position information, it is detected that the person is on some point around point P in the predetermined route in a predetermined period after and before the moment the character passes the point P. Therefore, candidates for the images in which the person is caught are selected from the image database 120 from such images that are captured in the period around the moment that the person passed passing point P and on the points around the point P in the predetermined route.

Furthermore, another character positioning unit 210 is provided on point Q which is located ahead of the point P in the predetermined route. There are two character positioning units 210, so that the period the person stays in the region point P through point Q is detected. The speed V of the person along the route is calculated, so that the candidate images in which the person is caught are further narrowed.

The speed V of the person when the person passes the point P or the speed V of the person going along the predetermined route is detected by the object speed detecting unit 240. The approximate position of the person after he or she passes the point P is forecast based on the time the person passes the point P and the speed V of the person. More narrowing of the number of images to be collected is executed based on this forecast point at a certain time; and more accuracy on the narrowing of the selection of images is realized.

(When a Plurality of Persons Goes Along the Route)

In some cases, a sequence of persons changes only a little while a plurality of persons go along the route. In such case, the persons are effectively identified by detecting the sequence of the persons. FIG. 21 shows an example of identifying the position of the plurality of persons in the predetermined route. Here, it is detected that character B passes the point P at the moment. The character B is going along the predetermined route between character A and character C. The position information about the character B at the moment includes information about the persons before and after the character B. Thus, as long as the sequence of the persons does not change, the sequence of the persons is forecast at points around the point P. Therefore, the persons before and after the character B in the sequence are identified using the position information of the character B at the moment the character B passes the point P when the character B is identified in the images captured at points different from the point P.

Applying the above described image collecting system, when images in which the person is possibly caught are collected from a large number of images captured at various points at various time periods, the system collects, based on the position information of the persons, the images which have higher possibility of having the person caught therein. Therefore, the collection of the images is executed effectively. Here, the description of the image searching system will be finished.

The image screening unit 300 limits the number of images captured by the camera system 40. The image screening unit 300 which is included in the image management server 20 will be described here.

Figure 22:
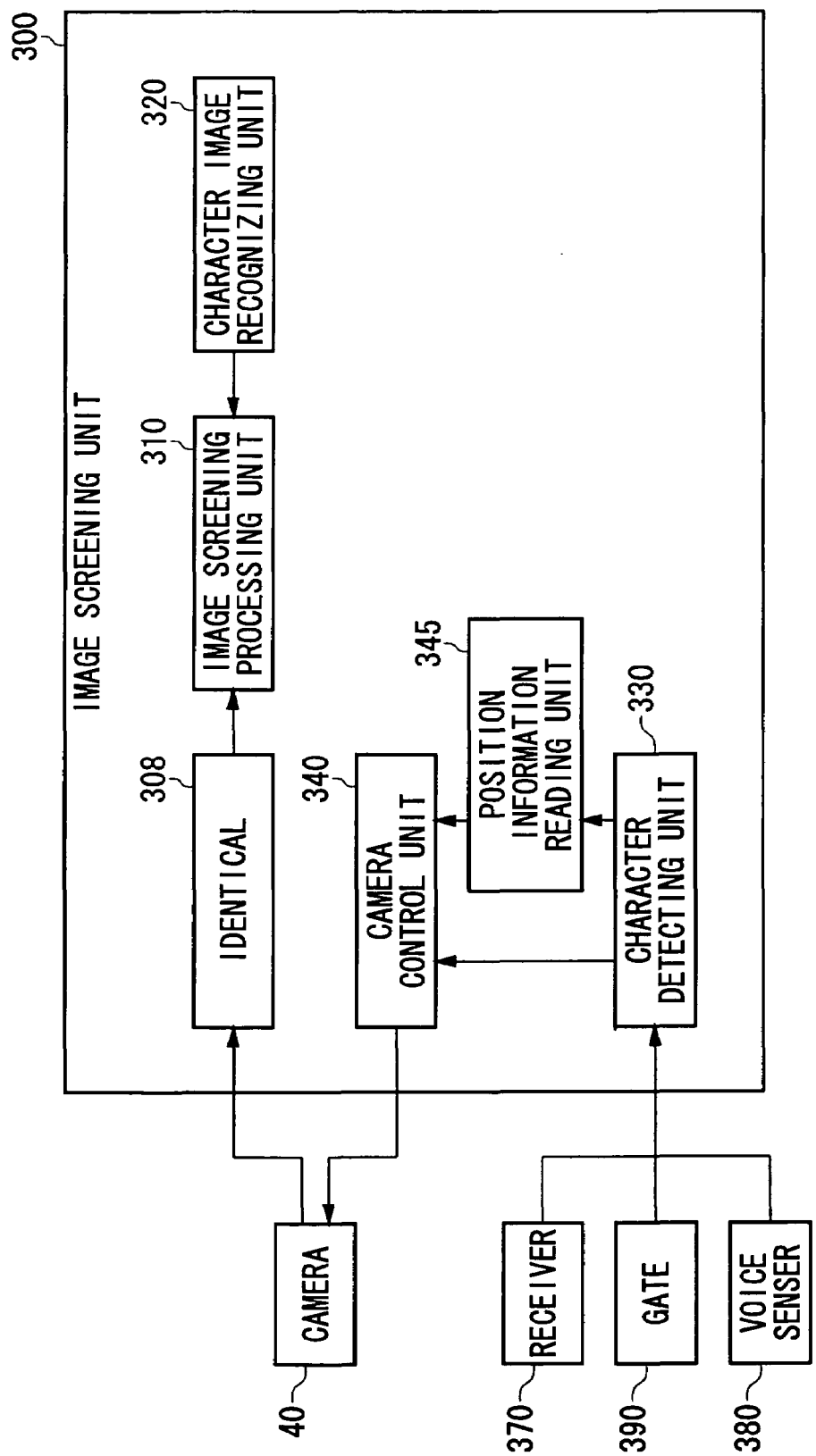
FIG. 22 is a block diagram of the image screening unit 300.

FIG. 22 is a block diagram of the image screening unit 300. The image screening unit 300 has an identical image selecting unit 308, an image screening processing unit 310, a character image recognizing unit 320, a character detecting unit 330, and a camera control unit 340. The image screening unit 300 is connected to the camera system 40, the receiver 370, the gate 390, and a voice sensor 380.

The identical image selecting unit 308 selects the images in which the same persons are caught when a plurality of images are captured by the camera system 40 in a certain area.

The image screening processing unit 310 limits the number of the images that are selected by the identical image selecting unit 308 and in which each of the persons is caught, to a predetermined number based on a predetermined condition.

The character image recognizing unit 320 recognizes a facial expression of each of the persons caught in the images captured by the camera system 40.

When the identical image selecting unit 308 recognizes that the same persons are caught in the plurality of images captured in the certain area, the image screening processing unit 310 decreases the number of the images in which the same persons are caught based on a predetermined condition. The process saves, for example, the first captured image of the same persons and deletes the rest of the images in which the same persons are caught. Thus, the number of images is reduced when there is a plurality of images in which the same persons are caught at similar background and these images are not very different from one another.

Figure 23:
FIG. 23 is an explanatory diagram of the processing executed by the character image recognizing unit 320.
Figure 23:
Figure 23:
Figure 23:

FIG. 23 is an explanatory diagram of the processing executed by the character image recognizing unit 320. An example of conditions for deleting images from the plurality of images having the same person caught therein is shown in FIG. 23. The conditions for deleting images are, for example, "eyes of the person are closed" or "a facial expression of the person is angry". The character image recognizing unit 320 chooses the images based on the conditions. In the example shown in FIG. 23, the image 1 and the image 3 are chosen, but the image 2 (the eyes are closed) and the image 4 (the facial expression looks angry) are deleted. Thus, images having the person whose facial expressions meet the conditions are obtained effectively.

On the contrary, a condition for saving images from a plurality of images in which the same persons are caught may be set up. The condition for saving is, for example, "the person caught in the image is smiling" and so on.

The description about the image screening unit 300 which reduces the number of the captured images based on a predetermined condition will be finished. The limitation is also applied to collection performed by the image collecting unit 90 and identification performed by the character identifying unit 95.

Next, limitations on the number of image capturing for the camera system 40 executed by the image screening unit 300 will be described.

Figure 24:
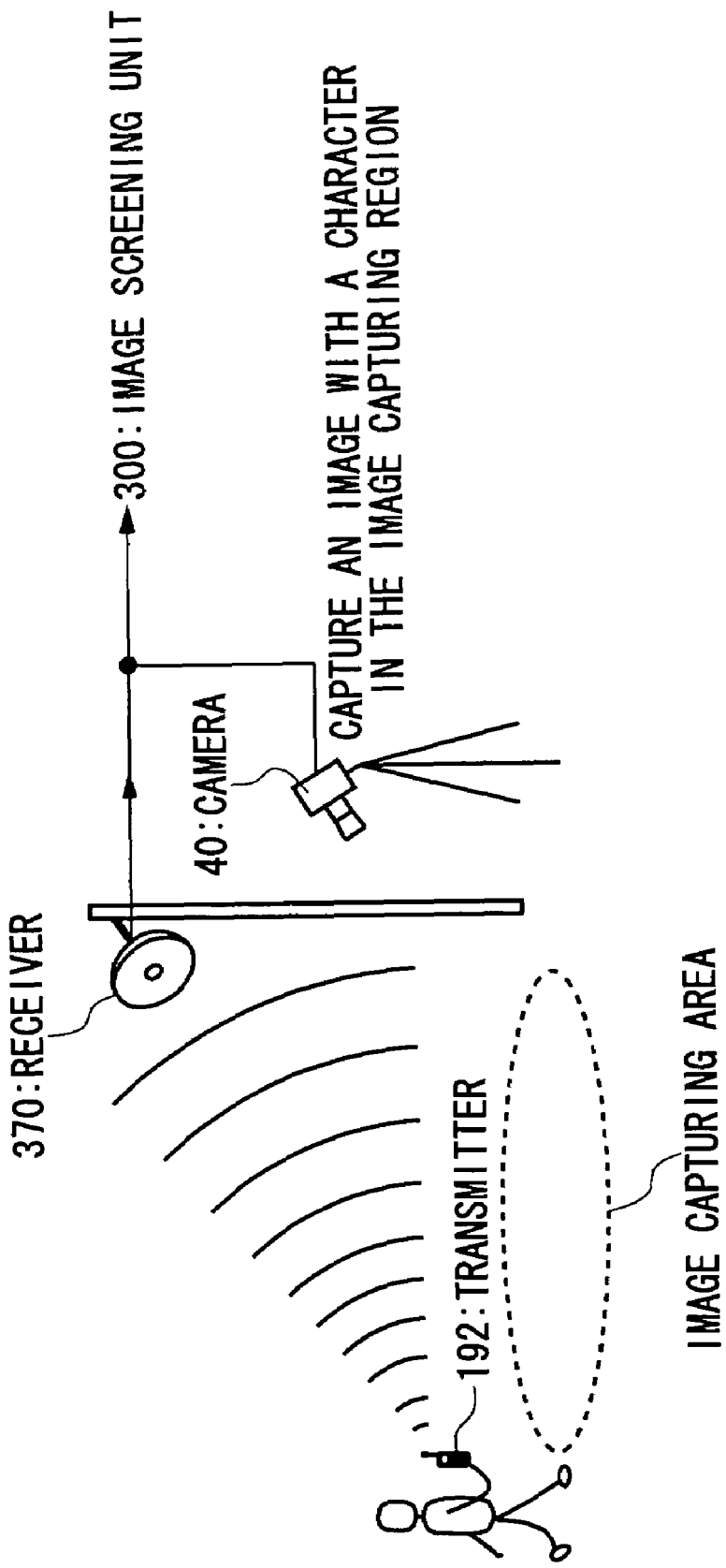
FIG. 24 is an explanatory diagram for detecting a position of a person executed by the character detecting unit 330 provided in the image screening unit 300.

FIG. 24 is an explanatory diagram for detecting a position of a person executed by the character detecting unit 330 provided in the image screening unit 300. In this case, the person carries a transmitter 192 transmitting radio waves. The transmitter 192 may be any kind of wireless communication means, for example, a cellular phone, an ID card transmitter, or a PHS. The receiver 370 receives the radio waves transmitted from the transmitter 192. The position of the person who has the transmitter 192 is detected by the strength of the received radio waves. Thus, when it is detected that the person is in a predetermined image capturing area, the camera control unit 340 prompts the camera system 40 to capture the image of the person in the predetermined image capturing area.

Figure 25:
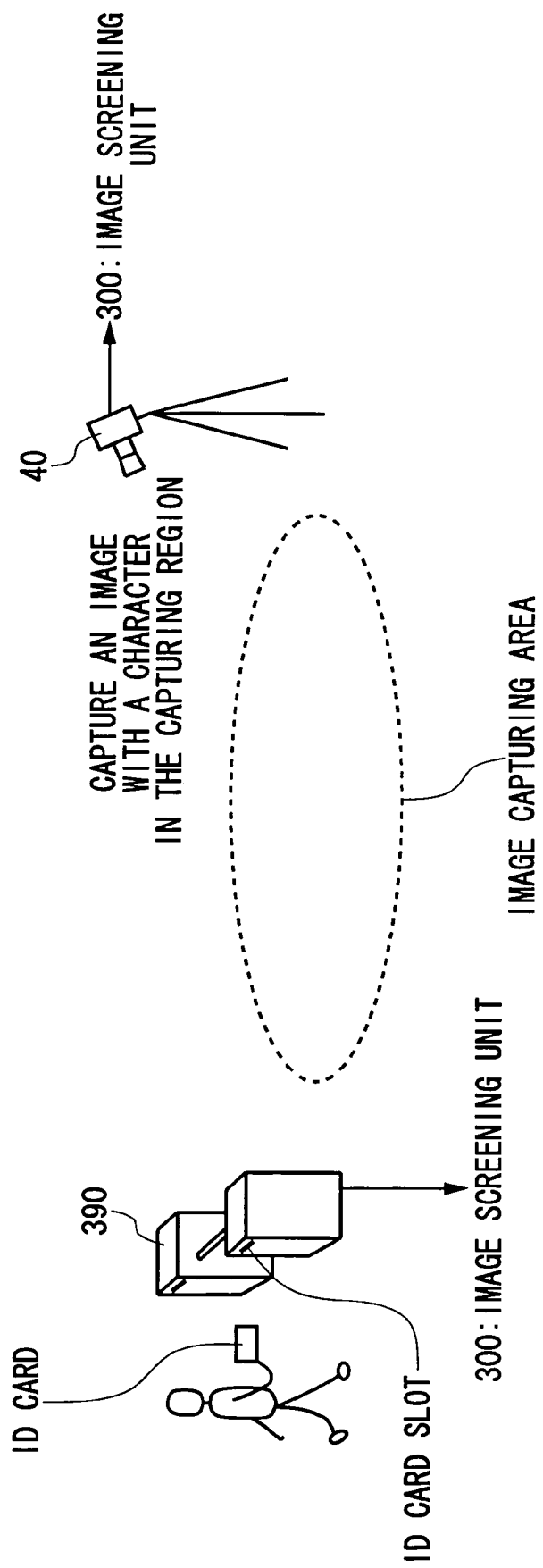
FIG. 25 shows another example of detection that the character detecting unit 330 detects a position of a person.

FIG. 25 shows another example of detection by which the character detecting unit 330 detects a position of a person. The person has an ID card for passing the gate 390. The character information of the person is recorded on the ID card. The character detecting unit 330 detects ingression of the person when the ID card is inserted into an ID card slot provided on the gate 390. After a predetermined period since entry of the person, the camera control unit 340 prompts the camera system 40 to capture an image of a predetermined capturing area. The camera system 40 captures the image in which the person is caught.

Figure 26:
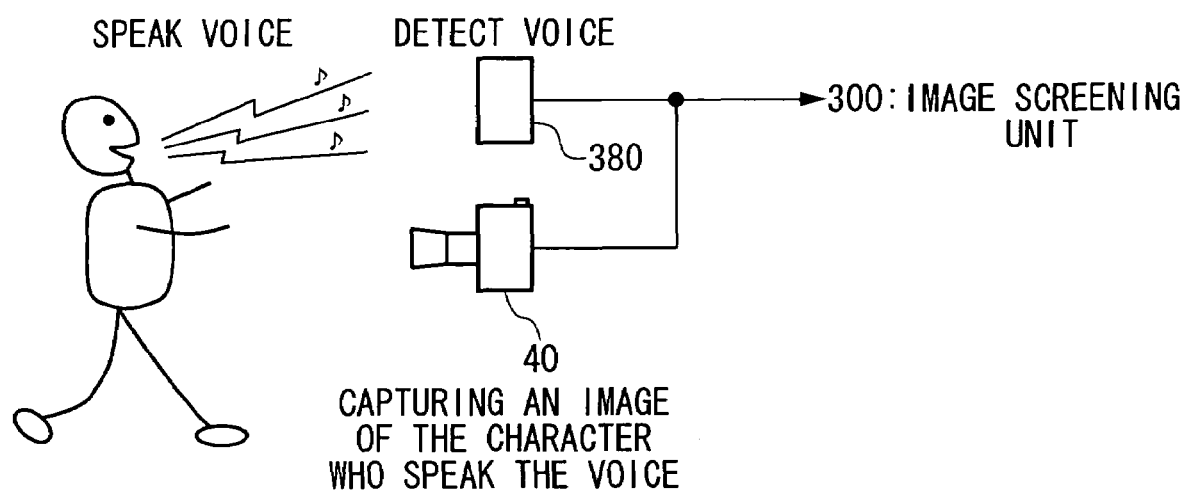
FIG. 26 is an explanatory diagram of image capturing using a voice sensor 380.

FIG. 26 is an explanatory diagram of image capturing using a voice sensor 380. The voice sensor 380 detects a call or cry by a person such as a whoop. When a whoop is detected, the camera system 40 is prompted to capture an image automatically. Thus, the facial expression of the person when the person is surprised or pleased by a predetermined object in the amusement park is effectively captured in the image, without capturing too many images which catch ordinary facial expressions of the person before and after the moment of the whoop.

Therefore, using the image screening unit 300, the number of the images to be searched is reduced, and only those images captured in proper timing are saved into the image database 120.

Obtaining the position information of the persons and the timing detection for screening images described above are also applied to the timing detection performed by the timing detecting unit 140 for capturing preferable images.

Applying the above described image distributing system 10, images of a target person playing in the amusement park with natural facial expression are captured. The images in which the person is caught are searched from the captured images and the user may purchase images in which the person is caught without carrying a camera in the amusement park and taking pictures.

This system may also be applied, for example, for security use, for detecting a registered person such as a habitual shoplifter. Applying this system, watching for a shoplifter using a camera system is effectively executed. In such case, an announcement that the shoplifter is registered to the security system works as a warning to prevent shoplifting.

Although the present invention has been described by way of exemplary embodiments, it should be understood that those skilled in the art might make many changes and substitutions without departing from the spirit and the scope of the present invention which is defined only by the appended claims.

What is claimed is:

1. An image collecting system for collecting an image having a target character therein, comprising:
   a camera system that captures an image in which the target character is caught in a predetermined area;
   an image database that stores images captured by said camera system;
   a character information database that stores character information for identifying a person caught in an image as the target character;
   a character positioning unit for obtaining position information representing a physical area in which the target character exists at a certain time among a plurality of areas; and
   an image collecting unit that connects to said image database and said character information database to identify images stored in said image database with the target character therein based on the character information stored in said character information database and the position information of the target character obtained by said character positioning unit, and collect images in which the target character is caught from the images stored in said image database.

2. The image collecting system as claimed in claim 1, further comprising:
   an image transmitter that connects to said camera system, said image database storing said images transmitted by said image transmitter;
   a position transmitter that transmits signals having said position information of the target character; and
   a receiver, located remote from said position transmitter, that receives said signals from said position transmitter, said receiver being operably connected to said character positioning unit.

3. The image collecting system as claimed in claim 1, further comprising:
   an ID information holder to be carried by the target character, the ID information holder having ID information that uniquely identifies the target character; and
   an ID information reader for reading the ID information from said ID information holder,
   wherein said character positioning unit obtains the position information of the target character based on the ID information read by said ID information reader.

4. The image collecting system as claimed in claim 1, wherein:
   when the target character is among a plurality of persons that are caught in a plurality of images,
   the position information of each person of the plurality of persons includes relative position information of said each person with respect to the plurality of persons, and
   each person of the plurality of persons is identified in one of said plurality of images and said target character from said plurality of persons is identified in all of said plurality of images,
   said image collecting unit identifies the rest of the plurality of persons in the rest of the plurality of images based on said relative position information of said each person.

5. The image collecting system as claimed in claim 1, wherein:
   said camera system includes a camera group having a plurality of cameras which capture a plurality of images in which a same person is caught from a plurality of different angles, and when a person in one of the plurality of images, which is caught by a camera included in said camera group, is identified as the target character, said image collecting unit identifies the same person in the rest of the plurality of images captured by the rest of the cameras included in said camera group as the target character, without accessing said character information database repeatedly.

6. The image collecting system as claimed in claim 1, wherein:

said camera system includes a camera group having at least one camera which captures a plurality of images in which a same person is caught at sequentially different moments, when said same person is identified as the target character in one of the plurality of images caught by said at least one camera in said camera group, said image collecting unit identifies the same person in the rest of the plurality of images as the target character, without accessing said character information database repeatedly.

7. The image collecting system as claimed in claim 1, wherein:

said character positioning unit obtains the position information of the target character which includes information that the target character passes a first predetermined point at a certain first time, and said image collecting unit limits images to identify the target character to images that are captured in a moving range of the target character for a period of time based on said first time the target character passes said first predetermined point.

8. The image collecting system as claimed in claim 7, wherein:

said character positioning unit obtains further position information of the target character which includes information that the target character passes a second predetermined point at a second time different from said first time, and said image collecting unit limits said images to identify the target character to images that are captured in said moving range for said period based on the first time and the second time that the target character passes said first and second predetermined points, respectively.

9. The image collecting system as claimed in claim 7, wherein:

said camera system includes a plurality of cameras operable to capture images in a predetermined route, said character positioning unit obtains said position information including information that the target character passes said first predetermined point on said predetermined route at said first time, and said image collecting unit limits said images to identify the target character to images that are captured in said moving range based on said time the target character passes said first predetermined point on said predetermined route.

10. The image collecting system as claimed in claim 9, wherein:

said character positioning unit obtains further position information of the target character which includes information that the target character passes a second predetermined point in said predetermined route at a second time different from said first time, and said image collecting unit limits said images to identify the target character to images that are captured in said moving range based on the first time and the second time the target character passes said first and second predetermined points, respectively, in said predetermined route.

11. The image collecting system as claimed in claim 1, further comprising:

a character speed obtaining unit that detects a speed of the target character, while moving through a predetermined route, at a certain moment at a predetermined point in said predetermined route; and a character position forecasting unit that forecasts a position of the target character after a predetermined time from said certain moment based on said speed of the target character going through said predetermined route and the position information of the target character at said moment the target character passes said predetermined point, wherein said camera system includes a plurality of cameras which capture images in said predetermined route, and said image collecting unit limits images to identify the target character to images that are captured by a camera included in said plurality of cameras and provided at said position forecast by said character position forecasting unit.

12. An image screening system that effectively accumulates data of images in which a certain target character is caught into an image database, comprising:

a camera system that captures an image having the target character therein in a predetermined area, and that records a time and place the image is captured;

an image transmitter that operably connects to said camera system;

a character information database that stores character information for identifying a person caught in an image as the target character;

a character positioning unit for obtaining position information of the target character at a certain time;

an image screening unit for identifying an area in which said camera system captures said image for the target character according to said time and said position information obtained by said character positioning unit, screening images captured in other areas out of a plurality of images to obtain remaining images and selecting said image having said target character from said remaining images according to said character information; and an image database that connects to said image screening unit and stores data of the selected image having the target character therein.

13. The image screening system as claimed in claim 12, further comprising:

a position transmitter for being carried by the target character; and a receiver that is located remote from said position transmitter to receive signals from said position transmitter, said receiver being operably connected to said character positioning unit.

14. The image screening system as claimed in claim 12, further comprising:

an ID information holder to be carried by the target character, the ID information holder having ID information that uniquely identifies the target character; and an ID information reader for reading the ID information from said ID information holder, wherein said character positioning unit obtains the position information of the target character based on the ID information read by said ID information reader.

15. The image screening system as claimed in claim 12, wherein:
when the target character is among a plurality of persons that are caught in a plurality of images,
the position information of each person of the plurality of persons includes relative position information of said each person with respect to the plurality of persons, and
each person of the plurality of persons is identified in one of said plurality of images and said target character from said plurality of persons is identified in all of said plurality of images,
said image collecting unit identifies the rest of the plurality of persons in the rest of the plurality of images based on said relative position information of said each person.

16. The image screening system as claimed in claim 12, wherein:
said camera system includes a camera group having a plurality of cameras which capture a plurality of images in which a same person is caught from a plurality of different angles, and
when a person in one of the plurality of images, which is caught by a camera included in said camera group, is identified as the target character,
said image screening unit identifies the same person in the rest of the plurality of images captured by the rest of the cameras included in said camera group as the target character, without accessing said character information database repeatedly.

17. The image screening system as claimed in claim 12, wherein:
said camera system includes a camera group having at least one camera which captures a plurality of images in which a same person is caught at sequentially different moments,
when said same person is identified as the target character in one of the plurality of images caught by said at least one camera in said camera group,
said image screening unit identifies the same person in the rest of the plurality of images as the target character, without accessing said character information database repeatedly.

18. The image screening system as claimed in claim 12, wherein:
said character positioning unit obtains the position information of the target character which includes information that the target character passes a first predetermined point at a certain first time, and
said image screening unit limits images to identify the target character to images that are captured in a moving range of the target character for a period of time based on said first time the target character passes said first predetermined point.

19. The image screening system as claimed in claim 18, wherein:
said character positioning unit obtains further position information of the target character which includes information that the target character passes a second predetermined point at a second time different from said first time, and
said image screening unit limits said images to identify the target character to images that are captured in said moving range for said period based on the first time and the second time that the target character passes said first and second predetermined points, respectively.

20. The image screening system as claimed in claim 19, wherein:
said camera system includes a plurality of cameras operable to capture images in a predetermined route,
said character positioning unit obtains said position information including information that the target character passes said first predetermined point on said predetermined route at said first time, and
said image screening unit limits said images to identify the target character to images that are captured in said moving range based on said time the target character passes said first predetermined point on said predetermined route.

21. The image screening system as claimed in claim 18, wherein:
said character positioning unit obtains further position information of the target character which includes information that the target character passes a second predetermined point in said predetermined route at a second time different from said first time, and
said image screening unit limits said images to identify the target character to images that are captured in said moving range based on the first time and the second time the target character passes said first and second predetermined points, respectively, in said predetermined route.

22. The image screening system as claimed in claim 12, further comprising:
a character speed obtaining unit that detects a speed of the target character, while moving through a predetermined route, at a certain moment at a predetermined point in said predetermined route; and
a character position forecasting unit that forecasts a position of the target character after a predetermined time from said certain moment based on said speed of the target character going through said predetermined route and the position information of the target character at said moment the target character passes said predetermined point,
wherein said camera system includes a plurality of cameras which capture images in said predetermined route, and
said image screening unit limits images to identify the target character to images that are captured by a camera included in said plurality of cameras and provided at said position forecast by said character position forecasting unit.

23. A method for collecting an image having a target character therein in a predetermined area, comprising:
registering character information of the target character;
capturing images in which the target character is caught and recording a time and place each image is captured;
storing image data of the captured images;
obtaining position information representing a physical area in which the target character exists at a certain time among a plurality of physical areas;
identifying a person in each of the images thus stored as the target character based on at least one of the character information thus registered, the time and place that said each image is captured, and the obtained position information of the target character when said each image is captured; and
collecting images in which the target character is identified.

24. The method for collecting an image as claimed in claim 23, further comprising:

transmitting position signals for the target character in said predetermined area from a transmitter carried by the target character, and receiving position signals of the target character that are transmitted by the transmitting of position signals, wherein the position information of the target character is obtained based on the received position signals of the target character.

25. The method for collecting an image as claimed in claim 24, further comprising:

allocating character ID to substantially every person in said predetermined area, wherein the character ID includes at least one of the character information and the position signals corresponding to said every person.

26. The method for collecting an image as claimed in claim 23, wherein:

when the target character is among a plurality of persons that are caught in a plurality of images, the obtaining of position information obtains relative position information of each person with respect to the plurality of persons, and the identifying of a person includes:

identifying each person of the plurality of persons in one of said plurality of images, identifying said target character in all of said plurality of images, and identifying the rest of the plurality of persons in the rest of the plurality of images based on said relative position information of said each person.

27. The method for collecting an image as claimed in claim 23, wherein:

the capturing images includes capturing a plurality of images in series in which a same person is caught, and the identifying a person includes:

identifying a person in one of the plurality of images as the target character, and identifying the same person in the rest of the plurality of images as the target character, without using the character information repeatedly.

28. The method for collecting an image as claimed in claim 27, wherein the capturing of a series of images includes capturing the plurality of images in series from a plurality of different angles.

29. The method for collecting an image as claimed in claim 27, wherein the capturing of a series of images includes capturing the plurality of images in series at sequentially different moments.

30. The method for collecting an image as claimed in claim 23, wherein:

the obtaining of position information includes detecting a first time that the target character passes a first predetermined point, and the identifying a person includes limiting images to identify the target character to images that are captured in a moving range of the target character for a period of time based on said first time the target character passes said first predetermined point.

31. The method for collecting an image as claimed in claim 30, wherein:

the obtaining of position information includes detecting a second time, different from said first time, that the target character passes a second predetermined point, and the identifying a person includes limiting said images to identify the target character to images that are captured in said moving range for said period based on the first time and the second time that the target character passes said first and second predetermined points, respectively.

32. The method for collecting an image as claimed in claim 30, wherein:

capturing images includes capturing a plurality of images in a predetermined route, the obtaining of position information includes detecting that the target character passes said first predetermined point on said predetermined route at said first time, and the identifying a person includes limiting said images to identify the target character to images that are captured in said moving range based on said time the target character passes said first predetermined point on said predetermined route.

33. The method for collecting an image as claimed in claim 32, wherein:

the obtaining of position information includes detecting a second time, different from said first time, that the target character passes a second predetermined point in said predetermined route, and the identifying a person includes limiting said images to identify the target character to images that are captured in said moving range based on the first time and the second time the target character passes said first and second predetermined points, respectively, in said predetermined route.

34. The method for collecting an image as claimed in claim 23, further comprising:

detecting a speed of the target character, while moving through a predetermined route, at a certain moment at a predetermined point in said predetermined route; and forecasting a position of the target character after a predetermined time from said certain moment based on said detected speed of the target character going through said predetermined route and obtained position information of the target character at said moment the target character passes said predetermined point, wherein the capturing images includes capturing a plurality of images in said predetermined route, and the identifying a person includes limiting images to identify the target character to images that are captured at said position in forecasting of a position.

35. A method for screening an image captured in a predetermined area, in order to store image data having a target character therein, the method comprising:

registering character information of the target character;

capturing images including at least one image with the target character therein, and recording a time and place each image is captured;

obtaining position information of the target character;

screening images thus captured by identifying an area in which said images including at least one image with the target character are captured according to said time and said obtained position information, filtering images captured in other areas out of said images to obtain remaining images and selecting said at least one image having said target character from said remaining images according to said character information; and storing image data of the screened at least one image with the target character is caught.

36. The method for screening an image as claimed in claim 35, further comprising:
transmitting position signals of the target character in said predetermined area from a transmitter with the target character, and
receiving position signals of the target character that are transmitted by the transmitting of position signals, for obtaining position information of the target character therefrom.

37. The method for screening an image as claimed in claim 36, further comprising:
allocating character ID to at least the target character in said predetermined area,
wherein the character ID includes at least one of the character information and the position signals of the target character.

38. The method for screening an image as claimed in claim 35, wherein:
when the target character is among a plurality of persons that are caught in a plurality of images,
the obtaining of position information obtains relative position information of each person with respect to the plurality of persons, and
the screening of images includes:
identifying each person of the plurality of persons in one of said plurality of images,
identifying said target character in all of said plurality of images, and
identifying the rest of the plurality of persons in the rest of the plurality of images based on said relative position information of said each person.

39. The method for screening an image as claimed in claim 35, wherein:
the capturing images includes capturing a plurality of images in series in which a same person is caught, and
the screening of images includes:
identifying a person in one of the plurality of images as the target character, and
identifying the same person in the rest of the plurality of images as the target character, without using the registered character information repeatedly.

40. The method for screening an image as claimed in claim 39, wherein the capturing of a series of images includes capturing the plurality of images in series from a plurality of different angles.

41. The method for screening an image as claimed in claim 39, wherein the capturing of a series of images includes capturing the plurality of images in series at sequentially different moments.

42. The method for screening an image as claimed in claim 35, wherein:
the obtaining of position information includes detecting a first time that the target character passes a first predetermined point, and
the screening of images includes limiting images to identify the target character to images that are captured in a moving range of the target character for a period of time based on said first time the target character passes said first predetermined point.

43. The method for screening an image as claimed in claim 42, wherein:
the obtaining of position information includes detecting a second time, different from said first time, that the target character passes a second predetermined point, and
the screening of images includes limiting said images to identify the target character to images that are captured in said moving range for said period based on the first time and the second time that the target character passes said first and second predetermined points, respectively.

44. The method for screening an image as claimed in claim 42, wherein:
capturing images includes capturing a plurality of images in a predetermined route,
the obtaining of position information includes detecting that the target character passes said first predetermined point on said predetermined route at said first time, and
the screening of images includes limiting said images to identify the target character to images that are captured in said moving range based on said first time the target character passes said first predetermined point on said predetermined route.

45. The method for screening an image as claimed in claim 44, wherein:
the obtaining of position information includes detecting a second time, different from said first time, that the target character passes a second predetermined point in said predetermined route, and
the screening of images includes limiting said images to identify the target character to images that are captured in said moving range based on the first time and the second time the target character passes said first and second predetermined points, respectively, in said predetermined route.

46. The method for screening an image as claimed in claim 35, further comprising:
detecting a speed of the target character, while moving through a predetermined route, at a certain moment at a predetermined point in said predetermined route; and
forecasting a position of the target character after a predetermined time from said certain moment based on said detected speed of the target character going through said predetermined route and obtained position information of the target character at said moment the target character passes said predetermined point,
wherein the capturing images includes capturing a plurality of images in said predetermined route, and
the screening of images includes limiting images to identify the target character to images that are captured at said position in forecasting of a position.

47. An image identifying system for identifying a plurality of persons caught in a plurality of images, captured in a predetermined area, with at least one target character therein, the image identifying system comprising:
an image set database that stores a plurality of images; each image of said plurality of images having the plurality of persons therein with at least one target character comprises an image set in said image set database;
a character information database that stores character information for identifying a person in an image as the target character;
a character positioning unit for obtaining position information representing a physical area in which the at least one target character exists at a certain time among a plurality of physical areas and relative position information of each person with respect to the plurality of persons in the image set; and
an image identifying unit for identifying the plurality of persons in the image set,
wherein when said image identifying unit identifies substantially all of the plurality of persons in one image included in the image set, based on the character information of the at least one target character in said one image and the relative position information of each person in the plurality of persons, the plurality of persons in the rest of the images in the image set is identified.

48. The image identifying system as claimed as claim 47, wherein the image set comprises a plurality of images captured from a plurality of angles at substantially the same time.

49. The image identifying system as claimed as claim 47, wherein the image set comprises a plurality of images captured at sequentially different moments in a period of time while the relative position information of each person in the plurality of persons substantially does not change.

50. A method for identifying a plurality of a same set of persons having at least one target character, caught in a plurality of images which are captured in a predetermined area, the method comprising:
   registering character information of each target character;
   capturing the plurality of images with the same set of persons having at least one target character therein;
   obtaining position information of each target character and relative position information of each person with respect to the same set of persons;
   identifying an area in which said plurality of images having at least one target character are captured according to said obtained position information;
   screening images captured in other areas out of said plurality of images to obtain remaining images; and
   selecting a plurality of images having said target character from said remaining images according to said character information,
   wherein when said each person of the same set of persons is identified in one of the plurality of images and one person of the same set of persons is identified in the rest of the plurality of images, the rest of the same set of persons in the rest of the plurality of the images are identified based on the relative position information of said each person in the same set of persons.

51. The method for identifying a plurality of a same set of persons as claimed in claim 50, wherein the capturing of the plurality of images includes capturing images, with the same set of persons having at least one target character, at substantially the same time from a plurality of angles.

52. The method for identifying a plurality of a same set of persons as claimed in claim 50, wherein:
   the relative position information of said each person in the same set of the persons substantially does not change, and
   the capturing of the plurality of images includes capturing images, with the same set of persons having at least one target character, at sequentially different moments of time.

53. A server for collecting an image in which a certain target character is caught, comprising:
   an image database storing image data, said image data including data of the image in which the target character is caught and data about when and where said image is captured;
   a character information database storing character information of the target character for identifying a person caught in the image with the target character;
   a character positioning unit obtaining position information representing a physical area in which the target character exists at a certain time among a plurality of physical areas; and
   an image collecting unit, connecting to said image database, said character information database, and said character positioning unit, for identifying the person caught in the image with the target character, and collecting the image in which the target character is caught from the image data stored in said image database,
   wherein said image collecting unit identifies the person caught in the image stored in said image database with the target character based on said data about when and where said image is captured, the character information stored in said character information database, and position information of the target character when the image is captured obtained by said character positioning unit.

54. An image screening server for accumulating images, in which a person as a target character is caught, into an image database for effectively offering an image in which the target character is caught, comprising:
   a character information database storing character information for identifying the person caught in the image with the target character;
   a character positioning unit obtaining position information of the target character;
   an image screening unit connecting to said character information database and said character positioning unit, and screening the images, when said images in which the target character is caught are sent with data about when and where the image is captured,
   said image screening unit identifying an area in which said images with the target character are caught according to said position information obtained by said character positioning unit and said data about when said image was captured, screening images captured in other areas out of a plurality of images to obtain remaining images and selecting said image in which the target character is caught from said remaining images according to said character information; and
   an image database storing screened images in which the target character is caught.

55. A recording medium which stores a program for a computer for collecting an image in which a target character is caught in a predetermined area, said program comprising:
   a first communicating module, which operates the computer to communicate with an image database storing the image, when image data having a person as the target character therein is sent with data about when and where the image is captured;
   a second communicating module, which operates the computer to communicate with a character information database storing character information for identifying a person caught in the image with the target character;
   a third communicating module, which operates the computer to communicate with a character positioning device obtaining position information representing a physical area in which the target character exists at a certain time among a plurality of physical areas; and
   an image collecting module, which operates the computer to connect to said first communicating module, said second communicating module, and said third communicating module, the image collecting module identifying the person caught in the images sent from said first communicating module with the target character based on the data about when and where the image is captured sent from said first communicating module, the character information sent from said second communicating module, and the position information of the target character when the image is captured sent from said third communicating module, and collecting the image in which the target character is caught.

56. A recording medium which stores a program for a computer for storing images, in which a person as a target character is caught, to accumulate into an image database for effectively offering an image in which the target character is caught, said program comprising:
- a first communicating module, which operates the computer to communicate with a character information database storing character information for identifying a person caught in an image as the target character;
- a second communicating module, which operates the computer to communicate with a character positioning device obtaining position information of the target character;
- an image screening module, which operates the computer to connect to said first communicating module and said second communicating module, to receive images in which the target character is caught sent with data of when and where the images are captured, the character information stored in the character information database sent by said first communicating module, and the position information of the target character at the time said each image is captured sent by said second communicating module, the image screening module identifying an area in which said images with the target character are caught according to said position information obtained by said character positioning device and said data of when said images are captured, screening images captured in other areas out of a plurality of images to obtain remaining images and selecting said image in which said target character is caught from said remaining images according to said character information, and
- a third communicating module, which operates the computer to communicate with an image database, to write the image in which the target character is caught, screened by said image screening module, to the image database.

* * * * *